US011343187B2

(12) United States Patent
Fischetti

(10) Patent No.: US 11,343,187 B2
(45) Date of Patent: May 24, 2022

(54) QUANTITATIVE EXACT MATCH DISTANCE IN NETWORK FLOWS

(71) Applicant: Intel Corporation, Santa Clara, CA (US)

(72) Inventor: Antonio Fischetti, Limerick (IE)

(73) Assignee: Intel Corporation, Santa Clara, CA (US)

( * ) Notice: Subject to any disclaimer, the term of this patent is extended or adjusted under 35 U.S.C. 154(b) by 1020 days.

(21) Appl. No.: 15/832,158

(22) Filed: Dec. 5, 2017

(65) Prior Publication Data

US 2019/0044856 A1    Feb. 7, 2019

(51) Int. Cl.
| | |
|---|---|
| *H04L 12/741* | (2013.01) |
| *H04L 45/745* | (2022.01) |
| *H04L 49/25* | (2022.01) |
| *G06F 9/455* | (2018.01) |
| *H04L 69/22* | (2022.01) |
| *H04L 45/74* | (2022.01) |
| *H04L 49/00* | (2022.01) |
| *H04L 101/695* | (2022.01) |
| *H04L 101/668* | (2022.01) |

(52) U.S. Cl.
CPC ........ *H04L 45/745* (2013.01); *G06F 9/45558* (2013.01); *H04L 45/742* (2013.01); *H04L 49/25* (2013.01); *H04L 69/22* (2013.01); *G06F 2009/45595* (2013.01); *H04L 49/70* (2013.01); *H04L 61/6068* (2013.01); *H04L 61/6095* (2013.01)

(58) Field of Classification Search
CPC ..... H04L 45/745; H04L 45/742; H04L 49/25; H04L 69/22; H04L 61/6068; H04L 49/70; H04L 61/6095; G06F 9/45558; G06F 2009/45595
See application file for complete search history.

(56) References Cited

U.S. PATENT DOCUMENTS

| | | | | |
|---|---|---|---|---|
| 9,779,150 | B1* | 10/2017 | Sherman | G06F 16/26 |
| 10,819,573 | B2* | 10/2020 | Maes | H04L 41/0859 |
| 2004/0073694 | A1* | 4/2004 | Frank | H04L 47/10 |
| | | | | 709/232 |
| 2006/0002292 | A1* | 1/2006 | Chang | H04L 45/02 |
| | | | | 370/225 |
| 2012/0240185 | A1* | 9/2012 | Kapoor | H04L 41/0866 |
| | | | | 726/1 |
| 2013/0212090 | A1* | 8/2013 | Sperling | G06F 16/93 |
| | | | | 707/723 |
| 2014/0040459 | A1* | 2/2014 | Agrawal | H04L 45/14 |
| | | | | 709/224 |

(Continued)

*Primary Examiner* — Mounir Moutaouakil
(74) *Attorney, Agent, or Firm* — Patent Capital Group

(57) ABSTRACT

There is disclosed an example of a host computing apparatus, including: an exact match cache (EMC) to perform exact matching according to an exact match tuple; a datapath classifier (DPCLS) to provide wildcard searching in a tuple search space (TSS) including a plurality of subtables, the subtables having one or more rule masks; a controller to receive a first packet having a first property matching a first rule of the classifier table, and forward header data of the packet to a partial rule module (PRM); and the PRM to compute a quantitative distance between the first rule and the exact match tuple of the EMC, and to execute a flow action for the first packet according to the quantitative distance.

25 Claims, 15 Drawing Sheets

(56) References Cited

U.S. PATENT DOCUMENTS

| | | | |
|---|---|---|---|
| 2014/0165200 A1* | 6/2014 | Singla | G06F 21/56 |
| | | | 726/23 |
| 2014/0369348 A1* | 12/2014 | Zhang | H04L 45/023 |
| | | | 370/389 |
| 2017/0092996 A1* | 3/2017 | Rodriguez | H01M 10/48 |
| 2017/0102943 A1* | 4/2017 | Voellmy | G06F 8/41 |
| 2017/0264555 A1* | 9/2017 | Yonezu | H04L 45/745 |

* cited by examiner

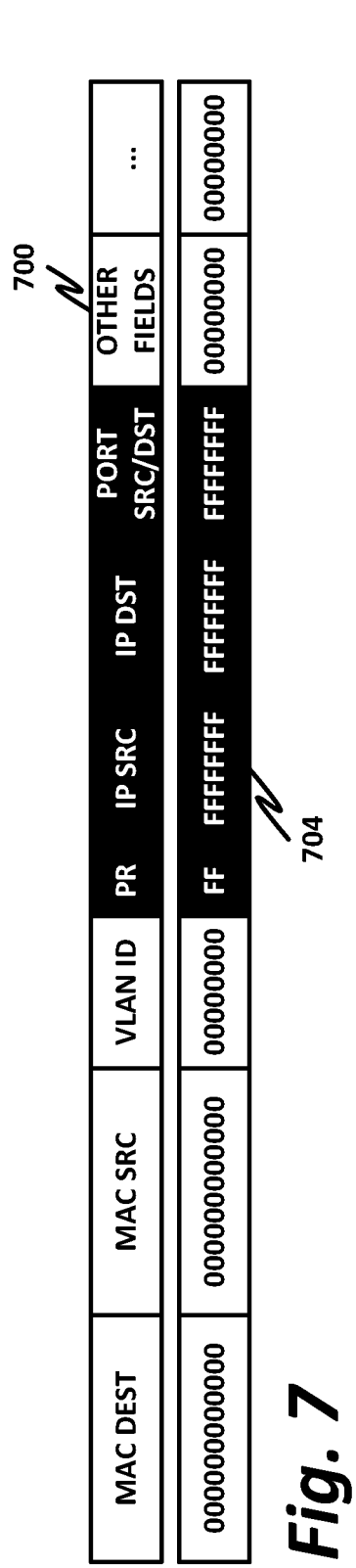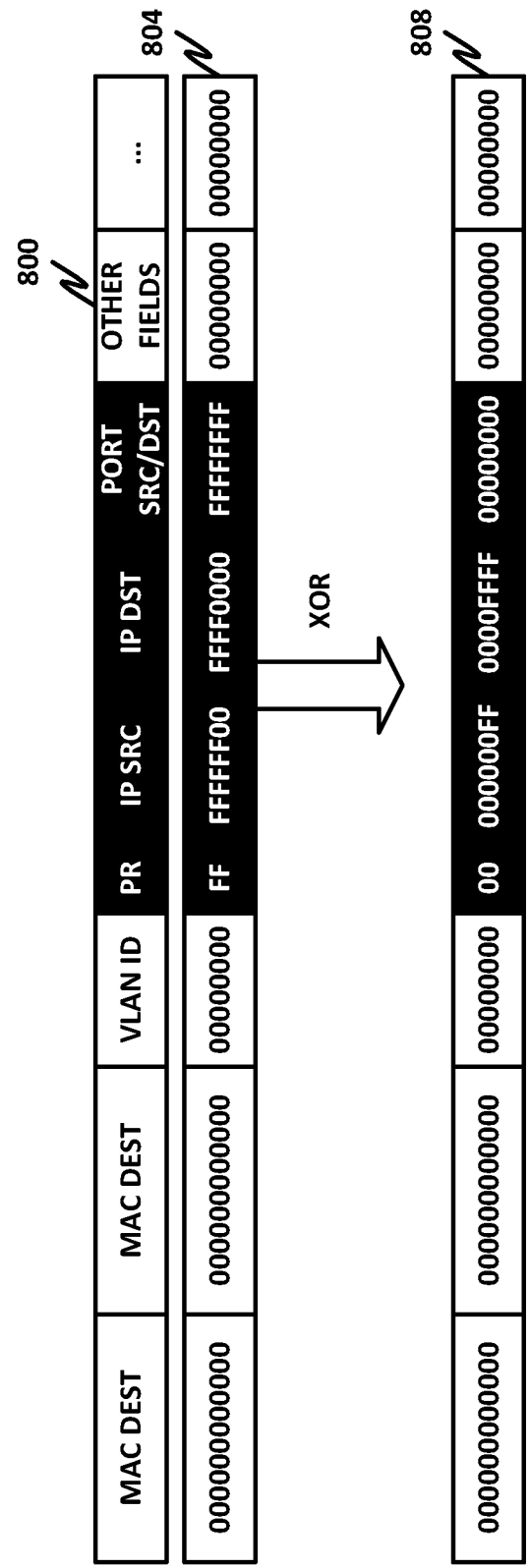

|  | VLAN ID | IP SRC | IP DEST | RANKING | HITS |
|---|---|---|---|---|---|
| SBT_1 MASK | FF.FF.FF.FF | FF.FF.FF.00 | | 3rd | 10% |
| SBT_2 MASK | | | FF.FF.FF.00 | 1st | 60% |
| SBT_3 MASK | | FF.FF.FF.FF | | 2nd | 30% |
| SBT_4 MASK | | | FF.FF.00.00 | 4th | 0% |

QUANTITATIVE EXACT MATCH DISTANCE IN NETWORK FLOWS

FIELD OF THE SPECIFICATION

This disclosure relates in general to the field of network computing, and more particularly, though not exclusively, to a system and method for quantitative exact match distance.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 7 illustrates an example of a packet header, according to one or more examples of the present specification.

FIG. 8 illustrates a computation of an E5 distance on a rule, according to one or more examples of the present specification.

FIG. 15 illustrates an example of four subtables with their masks and respective hits percentages, according to one or more examples of the present specification.

EMBODIMENTS OF THE DISCLOSURE

Figure 1:
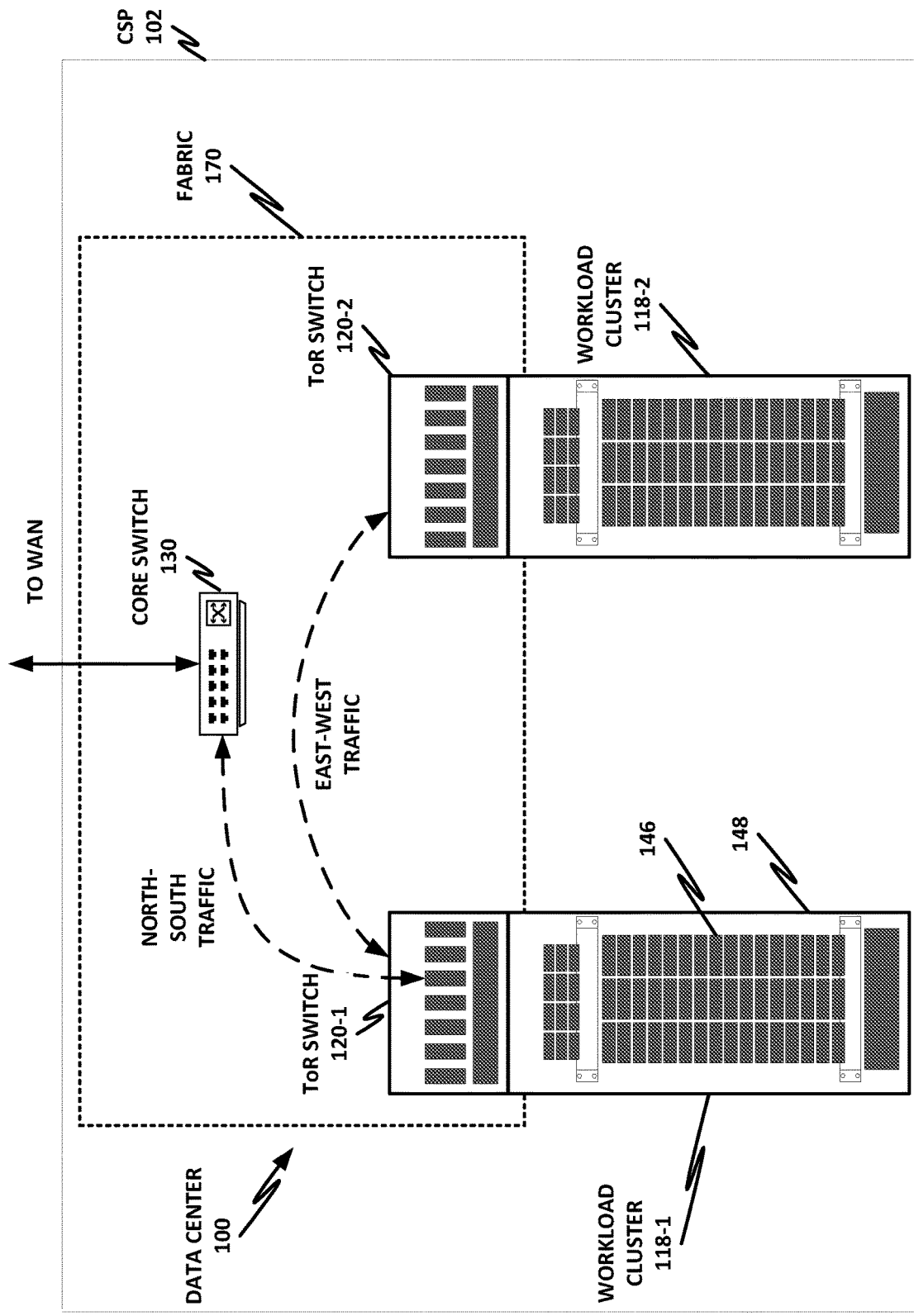
FIG. 1 illustrates selected components of a data center with network connectivity, according one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources.

As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

In a large data center, the efficiency and throughput of a virtual switch (vSwitch) that provides a virtualized interconnect between virtual machines (VMs) on one or more servers can be a significant factor in overall data center performance. In a contemporary data center, a large portion, and often even the majority of traffic is "east-west" traffic (i.e., traffic between various service nodes in the provider's architecture) instead of "north-south" traffic (i.e., traffic from end users to the provider). The large volume of east-west traffic means that virtual machines that provide a service chain or various packet processing services may handle a majority of the traffic.

A common vSwitch may be designed with a three-tier lookup table for making packet flow decisions. For example, in open vSwitch (OVS) using a data plane development kit (DPDK), an incoming packet may first be checked against an exact match cache (EMC). This is a relatively small cache containing, for example, 8192 entries, wherein headers for recently handled packets are cached. The header data stored in the EMC may include a 5-tuple of protocol type, source IP, destination IP, source port, and destination port. These values are hashed, and the flow control information, such as an egress port, for those entries is cached in the EMC.

As used throughout this specification, an EMC should be understood to include both the logic and data for the EMC function. Specifically, the EMC may include the logic for masking and hashing the incoming packet, as well as an EMC table to match the hashed value against. When a new packet comes in, the EMC may mask the header according to an EM5_Mask (i.e., a bit mask that masks out all bits except for the bits of this 5-tuple), hash the 5-tuple may, and if an exact match is found, route the packet according to the routing information in the EMC table.

In case of a miss on the EMC, the packet may be matched against a second level table called a data path classifier (DPCLS). As with the EMC, the DPCLS should be understood to include both the logic and data required to carry out its function. The DPCLS table may include wildcard matches, wherein groups of packets are assigned flows according to a flow mask. For example, a flow can be defined for all packets in the 10.0.1.0/24 subnetwork (which may also be written as 10.0.1.*). The DPCLS may also include rules that match according to a virtual network, or combinations of source and destination subnetworks by way of nonlimiting example. The DPCLS may be divided into a plurality of subtables, with each subtable including a rule mask, which is used to mask the input 5-tuple, and a match value that can be used to match the incoming packet. For example, if the DPCLS includes a subtable that is to match all traffic in the 10.0.1.* subnetwork, the flow mask for the rule may be a flow mask of FF.FF.FF.00 for the destination IP address, with a match value of 10.0.1.*.

Once a packet is matched in the DPCLS, then an exact match 5-tuple for that flow may be hashed and stored in the EMC. Thus, if data continues to arrive with that same flow information (i.e., the same 5-tuple), then it will hit on the EMC, and there will be no need to check the DPCLS.

At the third level, there may be a table such as an OpenFlow table that is configured by an administrator of the network or subnetwork, and which provides rules for assigning flows to traffic that do not hit on either the EMC or DPCLS. The OpenFlow table may also include default rules that handle traffic that cannot be matched, such as by marking the traffic as suspicious and logging it, sending it to a honeypot, assigning it to a default node, or otherwise handling the traffic.

When traffic is matched in the OpenFlow table, a corresponding rule may be added to a subtable in the DPCLS and an EMC entry may be added corresponding to the 5-tuple fields of the packet, so that future flows matching that rule do not need to propagate up to the OpenFlow table.

The cost of packet lookup increases progressively from the EMC to the DPCLS to the OpenFlow table. Thus, if a packet can be matched at the EMC, then it is advantageous to perform the lookup there rather than going to the DPCLS. If a packet can be matched at the DPCLS, it is advantageous to perform the lookup there rather than going to the OpenFlow table. But in some use cases, the EMC can actually become a bottleneck. When there are thousands of parallel flows coming into the network, the EMC may quickly get saturated because of the limited number of entries (for example, 8,192 entries). Every new insertion into the EMC becomes likely to overwrite entries that still refer to active flows. Continuous and recursive EMC overwrites can lead to a condition known as "EMC thrashing," which can lead to severe inefficiencies. Because the EMC is constantly being overwritten, it can actually become a bottleneck in the process. When EMC thrashing occurs, the performance of the EMC can fall below that of the DPCLS, thus rendering the EMC essentially useless. This issue can be exacerbated when packets are processed twice, such as in the case of tunneled packets (e.g., multiprotocol label switching (MPLS) or virtual local area network (VLAN)), or a connection tracker.

As illustrated in embodiments described above, tunneled packets and connection trackers require at least two EMC entries. Thus, when the EMC is full it is likely that two new insertions will overwrite two locations that the next incoming packets could hit. In other embodiments, each packet requires only one EMC entry.

To mitigate EMC thrashing, some existing systems use EMC probabilistic insertion to attempt to reduce the insertion overhead and the problem of continuous overwrites. Probabilistic insertion uses a criterion based on a random value generated at runtime. The EMC insertion occurs if the random value is greater than a threshold. This random criterion does reduce the EMC insertion, but does not guarantee a deterministic response.

A first "lucky" flow may be inserted into the EMC, and will remain there until a second flow colliding on the same location is "lucky" enough to evict the previous one from that EMC location. Because of the probabilistic nature of the insertion criterion, a new flow is likely to be inserted only after a sufficient number of attempts. Stated otherwise, each new flow is playing a lottery, and after buying enough tickets, it gets lucky and is inserted into the EMC. When a new Layer 4 connection begins, its packets are likely to be classified slowly because the EMC entry is present after some number of attempts (i.e., after the packet has "bought enough lottery tickets"). Until then, classification for that packet occurs on the DPCLS. Eventually, the flow gets lucky and is inserted into the EMC. After the flow gets lucky, connection packets for that flow will be processed faster. However, until the flow gets lucky, DPCLS lookups are never avoided.

A second difficulty with this architecture occurs with the tuple space search (TSS). In a TSS, each search on a single subtable is by itself a relatively costly operation that can impact the switching performance. Each subtable in the DPCLS is characterized by a rule mask applied to one or more fields of the packet, such as in a header or other field. For example, a subtable may be defined for flows with a/16 source IP subnetwork mask, and a/24 destination IP subnetwork mask. The rule mask for this table would be {SRC=FF.FF.00.00; DST=FF.FF.FF.00}. This subtable can include more than one entry, as long as those entries share the same rule mask. Each entry has a match value, and matching a flow comprises applying the rule mask to the IP header and comparing it to the one or more match values. For example, the above subtable may include two entries with the match values {SRC=3.3.0.0; DST=5.5.5.0} and {SRC=10.0.0.0; DST=21.1.1.0}. An incoming packet is checked against these tables by applying a mask to the full IP header that retains just the SRC IP and DST IP fields, applying the rule mask to those two fields and computing a hash value on the masked packet header to point to a subtable location. If an entry is found, it is compared with the masked packet header to check for a match. The comparison may not be carried out on all subtable entries, which could number in the millions. After the hash is computed, the result is a number (the hash value) that points to a subtable location. In the case that the result is empty, there is a miss.

Alternately, the location may contain an entry, so there is a check if it matches. If it matches, it is a hit. Otherwise, there may be a collision, and depending on the way the jumps are implemented, the DPCLS may jump to the next location and repeat the check with the entry, if any.

Note that in a common DPCLS, there may be as many as tens of different subtables to match against, each with one or more entries. Thus, a full DPCLS search involves sequentially searching each subtable until a match is found. If no match is found, then those tens of TSS searches are wasted as the packet is sent up to the OpenFlow table.

When rules overlap, as in the case of the OVS in kernel mode, all existing subtables are searched during a TSS. In the case of nonoverlapping rules, as in the case of OVS DPDK, a wildcard search can stop if a match is found on one subtable. However, this again relies on the luck of finding a matching subtable before all subtables are searched. Thus, the average number of traversed subtables can become a significant parameter that affects performance of the vSwitch.

For nonoverlapping rules, some existing systems may employ a subtable ranking system. This attempts to search first in the most-hit subtables. In a scenario with tens of subtables, the performance benefit may become less relevant. This happens when the hit frequency of the subtable ranked first is not more predominant than the overall hit frequency of all other remaining subtables.

All packets that do not hit the first subtable may represent a large percentage of ingress traffic. So the average number of subtables that must be traversed is still at least two if the most frequently hit subtable does not constitute, by itself, a majority of the traffic.

The overall efficiency of packet processing can be improved by the use of a quantitative measure of the "distance" of a particular rule from an exact match 5-tuple rule in the EMC.

This quantitative measure is referred to in this specification as an "EM5 distance," or in other words, how much the rule differs ("distance") from an exact-match 5-tuple in the EMC. The EM5 distance for flow rule ($Flow_R$) can be calculated as follows:

$$EM5_{Flow_R} = B(EM5_{MASK} \oplus FLOW_{MASK})$$

Where B is the number of "1" bits resulting from a logical XOR of the EM5 mask ($EM5_{MASK}$) and the mask of the flow rule ($FLOW_{MASK}$). The EM5 value can be expressed as a decimal number of the form $EM5_{10} = 2^{EM5}$. For example, if the XOR of the EM5 mask with the flow rule mask yields 6 "1's," then $EM5_{10} = 2^6 = 24$.

The EM5 distance represents an estimate of how much a megaflow rule is different from an exact match 5-tuple rule. As a subtable collects wildcarded rules with the same mask, each of its entries may have the same EM5 distance. Further, EM5 distance can be seen as a property of the subtable. When a new subtable is created, EM5 distance can be calculated based on the mask that each of its entries contains.

EM5 distance provides an empirical method to estimate how likely a mega flow rule is to "flood" the EMC. The EM5 distance may also be used as a criterion for defining partial rules and criteria that allow certain flows to skip EMC lookup and insertion altogether, and to restrict the number of subtables on which a wildcard search is performed. For example, a "pivot field" may be defined, and incoming traffic may first be diverted to a partial rule module (PRM) which could be, for example, a field programmable gate array. The PRM computes the EM5 for the incoming packet based on the pivot field, and if the EM5 exceeds a particular threshold, then the EMC is skipped altogether. In other words, if the partial rule would match a large number of incoming packets, then the EM5 is larger, and caching specific entries in the EMC may lead to EMC thrashing. Thus, these packets with large EM5s may be sent directly to the DPCLS.

Further advantageously, the pivot field can be used in the PRM to determine which subtables in the DPCLS may potentially match the incoming packet. Thus, rather than searching all subtables in the DPCLS, the PRM may provide a filtered list of subtables to search in the DPCLS. So even when traffic skips the EMC and is searched in the DPCLS, the DPCLS search is more efficient than it would be if all subtables had to be searched.

The use of the EM5 distance as a criterion for making flow decisions within the vSwitch advantageously mitigates EMC thrashing and reduces the number of traversed subtables in the DPCLS. Thus, this may improve the deterministic response of packet classification.

By way of illustrative example, consider an OVS in kernel space. There may be several thousand Layer 4 flows, with tens of subtables being used in the DPCLS. Because this is in kernel space, all subtables will be traversed to check all matches in the DPCLS for each packet. However, using the teachings of this specification, including the use of an EM5 distance to filter the subtables in a PRM, the number of total subtables checked is reduced.

By way of a second illustrative example, consider the case of an OVS with DPDK. Again, there may be several thousand Layer 4 flows with tens of subtables in the DPCLS. In a case where subtable ranking is used, the hit frequency of the top-ranked subtable may be much less than the hit frequency of all other subtables. Thus, the use of a PRM is a benefit for those packets that do not hit the top-ranked subtable. For example, in one scenario, a first subtable may be hit 30% of the time, a second subtable may be hit 25% of the time, a third subtable may be hit 21% of the time, and other subtables may hit smaller percentages of traffic. Thus, only 30% of traffic can be matched by a single subtable in the DPCLS. Seventy percent of traffic is not hitting the first subtable. Thus, the wildcard search for 70% of packets find a match after traversing a minimum of two subtables, so that the average number of traversed subtables is generally greater than two. However, the use of an EM5 value within a PRM can reduce the average number of subtables searched.

A third use case contemplates privileging of signaling traffic. In this case, packet switching may be based on rules that specify the protocol type. For example:

Rule 1: Input port: 1, Protocol type: SCTP, Action: Output to Virtual Machine VM3. Rule 1 is stored in subtable 1.

Rule 2: Input port: 1, Protocol type: TCP, IP destination: 10.1.1.10, Source port: 0-256, Destination port: 0-1024, Action: Output to VM1. Rule 2 is stored in subtable 2.

Rule 3: Input port: 1, Protocol type: TCP, Destination port: 8080, Action: Output to VM4. Rule 3 is stored in subtable 3.

In this case, there are three subtables, one for each rule. When signaling traffic hits rule 1, it constitutes only a small percentage of all traffic. Subtable ranking would cause the subtable that is storing rule 1 to be ranked in last place. So signaling packets hitting rule 1 would be classified after checking a match on the first two subtables. For signaling packets the average number of traversed subtables is three.

However, by using the PRM with an EM5 value of the present specification, a selection of the pivot field may be "protocol type." On reception of signaling packets, the list of candidates output by the PRM would contain just subtable 1. Therefore, only subtable one would be traversed on a DPCLS hit, thus reducing the average number of traversed subtables to 1.

A fourth use case contemplates tunneled or connection tracker packets. Tunneled may typically be processed by removing or adding tunneling information (e.g., adding or removing a VLAN tag). After that, the original packet has changed and needs to be processed again, known as recirculation. Similarly, when the connection tracker is enabled, the vSwitch acts as a firewall. In the case of recirculation, there are two EMC entries for each connection or tunnel, because the original packet and the modified packet may both be cached in the EMC. Thus, EMC thrashing becomes more likely. Furthermore, there may be two subtables with the same hit frequencies, thus making the average number of subtable hits approximately two. However, as before, the use of a PMR and an EM5 value can mitigate this increased number of lookups and increased likelihood of thrashing.

A system and method for quantitative exact match distance will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 illustrates selected components of a data center with connectivity to network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS). CSP 102 may provide servers that may benefit from having a vSwitch that implements the teachings of the present specification.

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

In this illustration, workload clusters 118 are shown as modular workload clusters conforming to the rack unit ("U") standard, in which a standard rack, 19 inches wide, may be built to accommodate 42 units (42 U), each 1.75 inches high and approximately 36 inches deep. In this case, compute resources such as processors, memory, storage, accelerators, and switches may fit into some multiple of rack units from one to 42.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® Host Fabric Interface (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® Omni-Path™, TrueScale™, Ultra Path Interconnect (UPI) (formerly called QPI or KTI), FibreChannel, Ethernet, Fibre-Channel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (A™) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
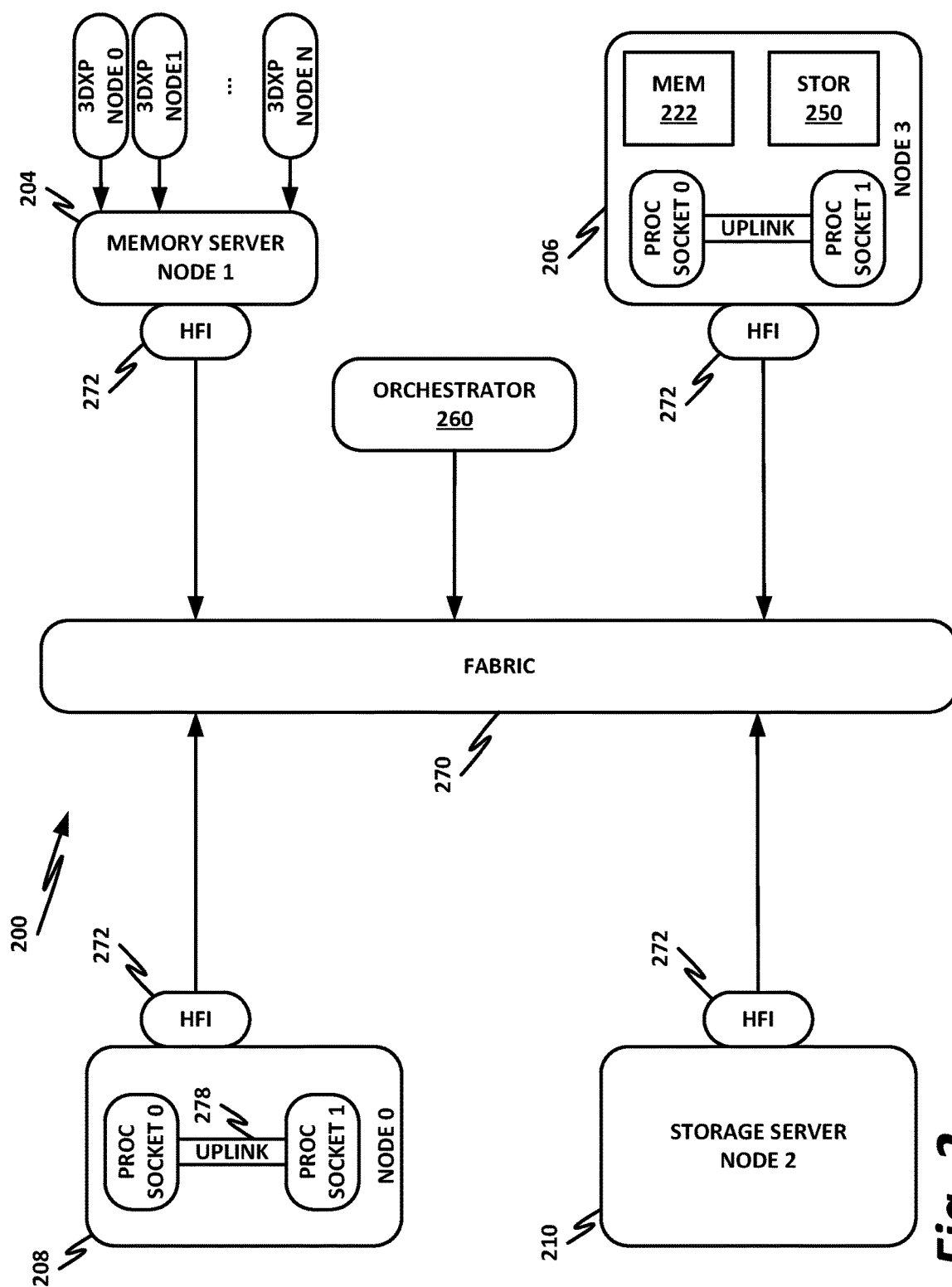
FIG. 2 is a block diagram of a data center, according to one or more examples of the present specification.

FIG. 2 is a block diagram of a data center 200 according to one or more examples of the present specification. Data center 200 may be, in various embodiments, the same as network 100 of FIG. 1, or may be a different data center. Additional views are provided in FIG. 2 to illustrate different aspects of data center 200. Data center 200 may include servers that can benefit from the teachings of the present specification.

In this example, a fabric 270 is provided to interconnect various aspects of data center 200. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via an HFI 272. HFI 272 may connect to an Intel® Omni-Path™ fabric. In some examples, communication with fabric 270 may be tunneled, such as by providing UPI tunneling over Omni-Path™.

Because data center 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout data center 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a HFI 272, which provides fast communication that makes these technologies possible.

By way of further illustration, node 3 206 is also depicted. Node 3 206 also includes a HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
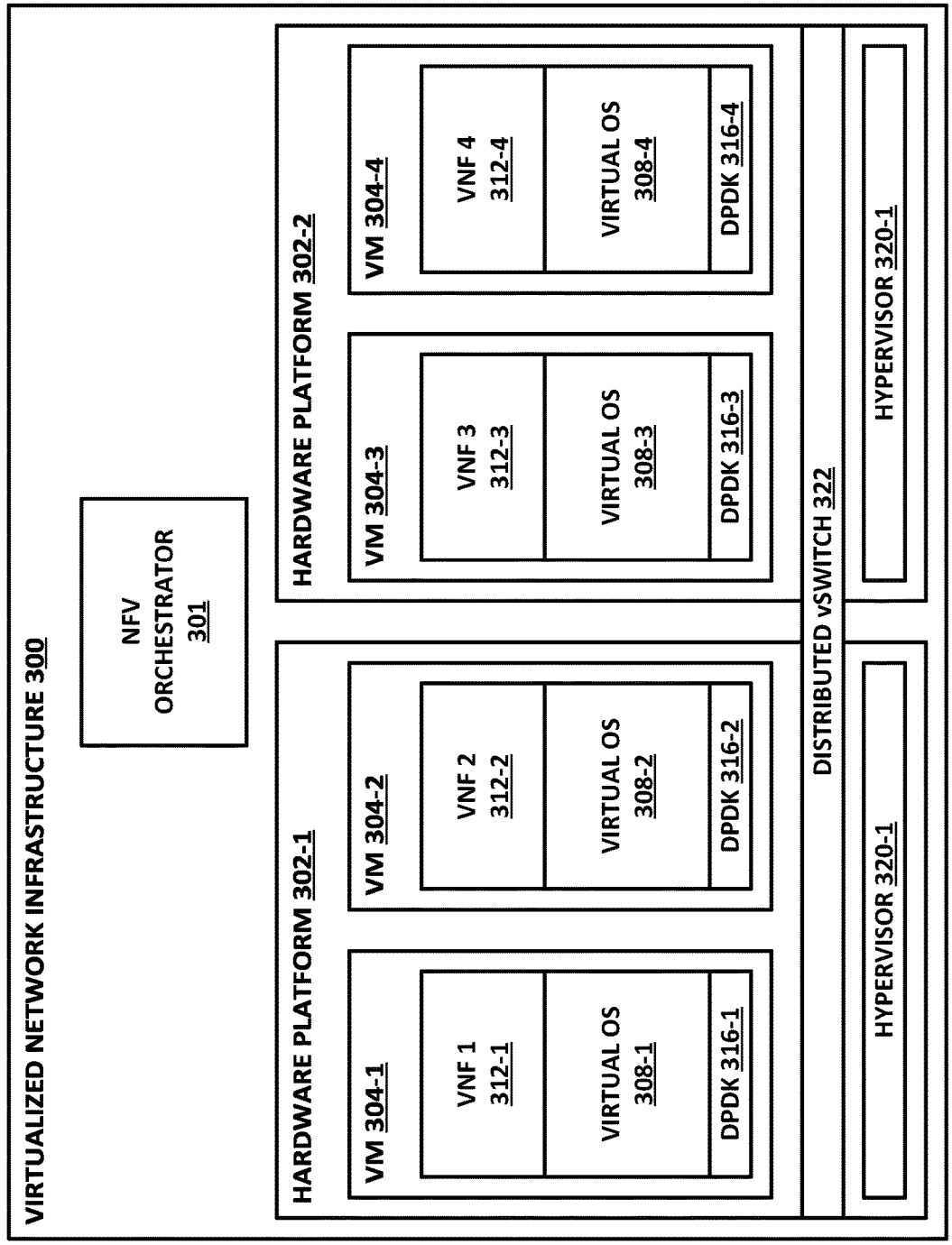
FIG. 3 is a block diagram of a network function virtualization (NFV) architecture, according to one or more examples of the present specification.

FIG. 3 is a block diagram of a network function virtualization (NFV) architecture according to one or more examples of the present specification. NFV is a second nonlimiting flavor of network virtualization, often treated as an add-on or improvement to SDN, but sometimes treated as a separate entity. NFV was originally envisioned as a method for providing reduced capital expenditure (Capex) and operating expenses (Opex) for telecommunication services. One important feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI). Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 3, an NFV orchestrator 302 manages a number of the VNFs running on an NFVI 304. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus the need for NFV orchestrator 302.

Note that NFV orchestrator 302 itself is usually virtualized (rather than a special-purpose hardware appliance). NFV orchestrator 302 may be integrated within an existing SDN system, wherein an operations support system (OSS) manages the SDN. This may interact with cloud resource management systems (e.g., OpenStack) to provide NFV orchestration. An NFVI 304 may include the hardware, software, and other infrastructure to enable VNFs to run. This may include a rack or several racks of blade or slot servers (including, e.g., processors, memory, and storage), one or more data centers, other hardware resources distributed across one or more geographic locations, hardware switches, or network interfaces. An NFVI 304 may also include the software architecture that enables hypervisors to run and be managed by NFV orchestrator 302. Running on NFVI 304 are a number of virtual machines, each of which in this example is a VNF providing a virtual service appliance. These include, as nonlimiting and illustrative examples, VNF 1 310, which is a firewall, VNF 2 312, which is an intrusion detection system, VNF 3 314, which is a load balancer, VNF 4 316, which is a router, VNF 5 318, which is a session border controller, VNF 6 320, which is a deep packet inspection (DPI) service, VNF 7 322, which is a network address translation (NAT) module, VNF 8 324, which provides call security association, and VNF 9 326, which is a second load balancer spun up to meet increased demand.

Firewall 310 is a security appliance that monitors and controls the traffic (both incoming and outgoing), based on matching traffic to a list of "firewall rules." Firewall 310 may be a barrier between a relatively trusted (e.g., internal) network, and a relatively untrusted network (e.g., the Internet). Once traffic has passed inspection by firewall 310, it may be forwarded to other parts of the network.

Intrusion detection 312 monitors the network for malicious activity or policy violations. Incidents may be reported to a security administrator, or collected and analyzed by a security information and event management (SIEM) system. In some cases, intrusion detection 312 may also include antivirus or antimalware scanners.

Load balancers 314 and 326 may farm traffic out to a group of substantially identical workload servers to distribute the work in a fair fashion. In one example, a load balancer provisions a number of traffic "buckets," and assigns each bucket to a workload server. Incoming traffic is assigned to a bucket based on a factor, such as a hash of the source IP address. Because the hashes are assumed to be fairly evenly distributed, each workload server receives a reasonable amount of traffic.

Router 316 forwards packets between networks or sub-networks. For example, router 316 may include one or more ingress interfaces, and a plurality of egress interfaces, with each egress interface being associated with a resource, subnetwork, virtual private network, or other division. When traffic comes in on an ingress interface, router 316 determines what destination it should go to, and routes the packet to the appropriate egress interface.

Session border controller 318 controls voice over IP (VoIP) signaling, as well as the media streams to set up, conduct, and terminate calls. In this context, "session" refers to a communication event (e.g., a "call"). "Border" refers to a demarcation between two different parts of a network (similar to a firewall).

DPI appliance 320 provides deep packet inspection, including examining not only the header, but also the content of a packet to search for potentially unwanted content (PUC), such as protocol non-compliance, malware, viruses, spam, or intrusions.

vSwitch 322, which may be a distributed or nondistributed vSwitch, may be improved according to the teachings of the present specification.

Call security association 324 creates a security association for a call or other session (see session border controller 318 above). Maintaining this security association may be critical, as the call may be dropped if the security association is broken.

The illustration of FIG. 3 shows that a number of VNFs have been provisioned and exist within NFVI 304. This figure does not necessarily illustrate any relationship between the VNFs and the larger network.

Figure 4:
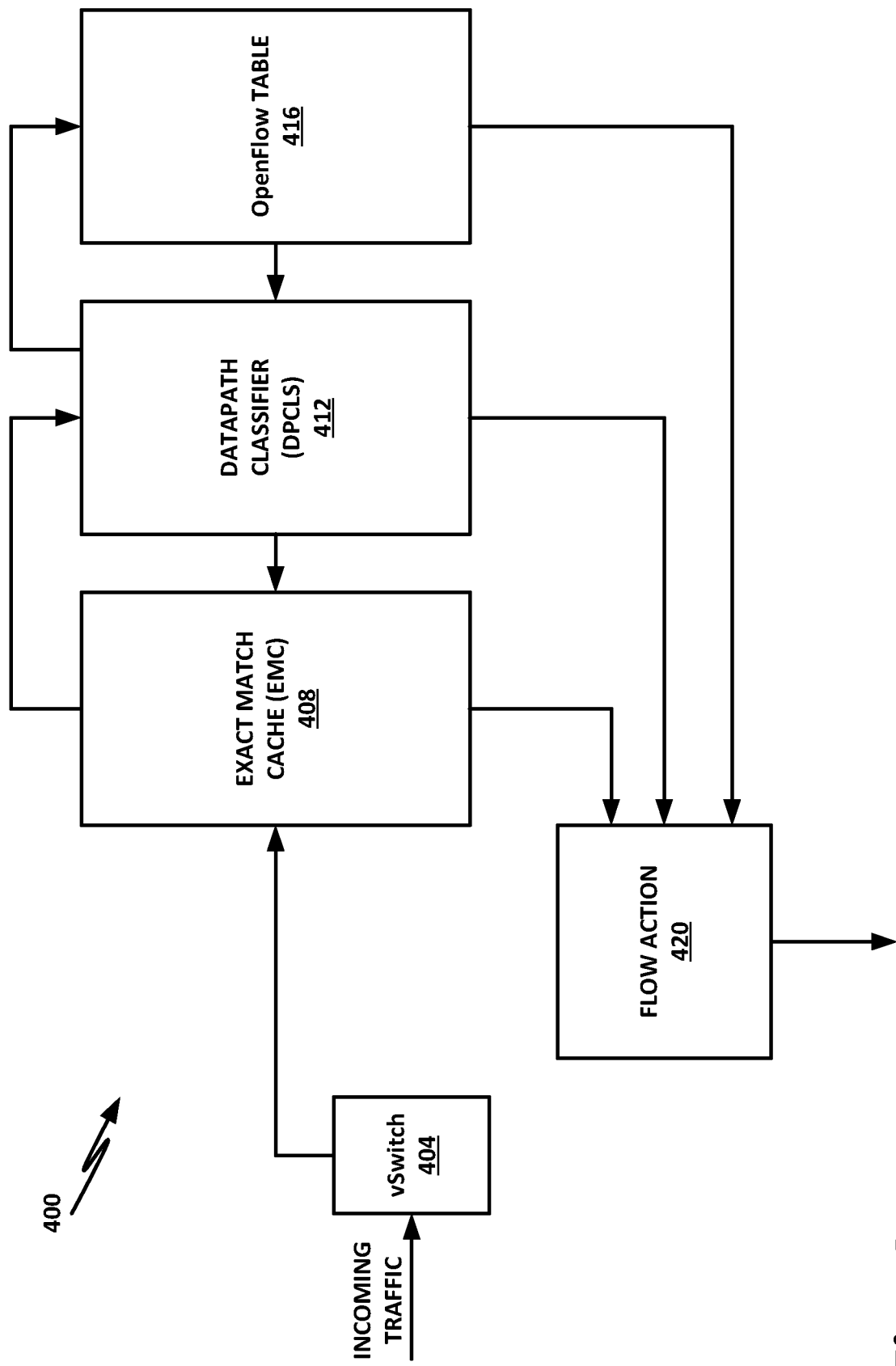
FIG. 4 is a block diagram of a virtual switching (vSwitch) architecture, according to one or more examples of the present specification.

FIG. 4 is a block diagram of a virtual switching (vSwitch) architecture, according to one or more examples of the present specification. In the example of FIG. 4, incoming traffic arrives on vSwitch 404. As described above, vSwitch 404 may include a three-tier lookup, including an exact match cache (EMC) 408, a data path classifier (DPCLS) 412, and an OpenFlow table 416.

In existing systems, when incoming traffic arrives at vSwitch 404, vSwitch 404 first hashes the 5-tuple of the header of the packet, and attempts to match it within EMC 408. If there is a match in EMC 408, then the traffic is sent for a flow action, such as directing the packet to a designated egress port. If there is a miss on the EMC, then traffic is next diverted to DPCLS 412. As described above, DPCLS may include a number of subtables, each with a mask and a match value, and vSwitch 404 may traverse one or more of the subtables in DPCLS 412, attempting to match the packet to the associated rules. If a match is found, then again, the traffic is sent to flow action 420 where the appropriate flow action is taken. In some cases, DPCLS 412 may also hash the 5-tuple, and back-propagate the hashed 5-tuple to EMC 408 with the appropriate rule, so that the next time a packet with a matching 5-tuple arrives, it can be looked up on EMC 408. As described above, there may be various strategies employed to reduce EMC thrashing.

If there is a miss on DPCLS 412, then traffic is finally sent to OpenFlow table 416 to find an appropriate rule for processing the traffic. Once OpenFlow table 416 finds the appropriate rule, the packet is sent to flow action 420, and the appropriate flow action is taken. As with DPCLS 412, OpenFlow table 416 may back-propagate a matching rule to DPCLS 412, so that future packets can be matched on DPCLS 412.

As discussed in greater detail above, this architecture may suffer from certain limitations if no measures are taken to prevent EMC thrashing, and to limit the number of DPCLS subtables in the search space.

Figure 5:
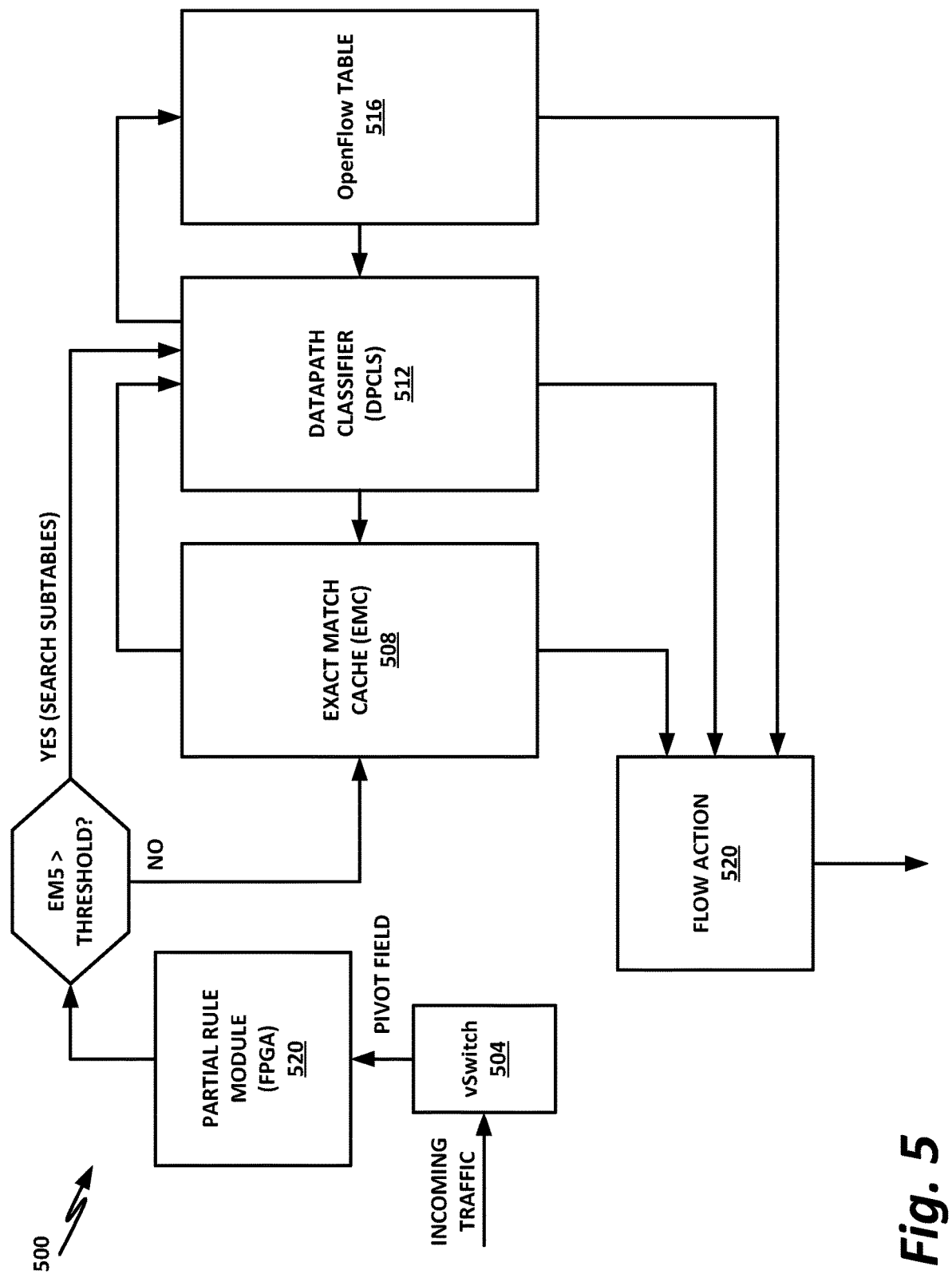
FIG. 5 illustrates a vSwitch architecture that mitigates difficulties by use of calculating a quantitative exact match distance for incoming packets, according to one or more examples of the present specification.

FIG. 5 illustrates a vSwitch architecture 500 that mitigates difficulties by use of calculating a quantitative exact match distance for incoming packets, according to one or more examples of the present specification.

As before, incoming traffic arrives at vSwitch 504. However, in this case, vSwitch 504 may mask out a pivot field, which is described in greater detail in connection with FIGS. 7-10, below. The pivot field may be sent to a partial rule module (PRM), which may be, for example, an ASIC, an FPGA, a coprocessor, a software module, or other appropriate computing module. PRM 520 uses the pivot field from the packet to output a candidate list of subtables in which a match can potentially occur. Within the candidates the minimum value of their EM5 distance may be considered. If the minimum value exceeds a threshold, then the packet is designated to skip EMC 508 altogether. Otherwise, the packet is searched against the EMC, and misses are handled as in the case of FIG. 4.

In the case where the EM5 of the matching rule is greater than the threshold, then when the EMC is skipped, the PRM may also compute a list of subtables that might potentially match the incoming packet. Thus, rather than searching all tables on DPCLS 512, vSwitch 504 needs only search the search subtable list, which may be fewer than all of the subtables available on DPCLS 512. As before, a miss on DPCLS 512 will be passed up to OpenFlow table 516, and rules and hashes may be back-propagated from OpenFlow table 516 to DPCLS 512, or from DPCLS 512 to EMC 508. Further as before, once a match is found, the packet is assigned a flow action 520, and processed accordingly.

Figure 6:
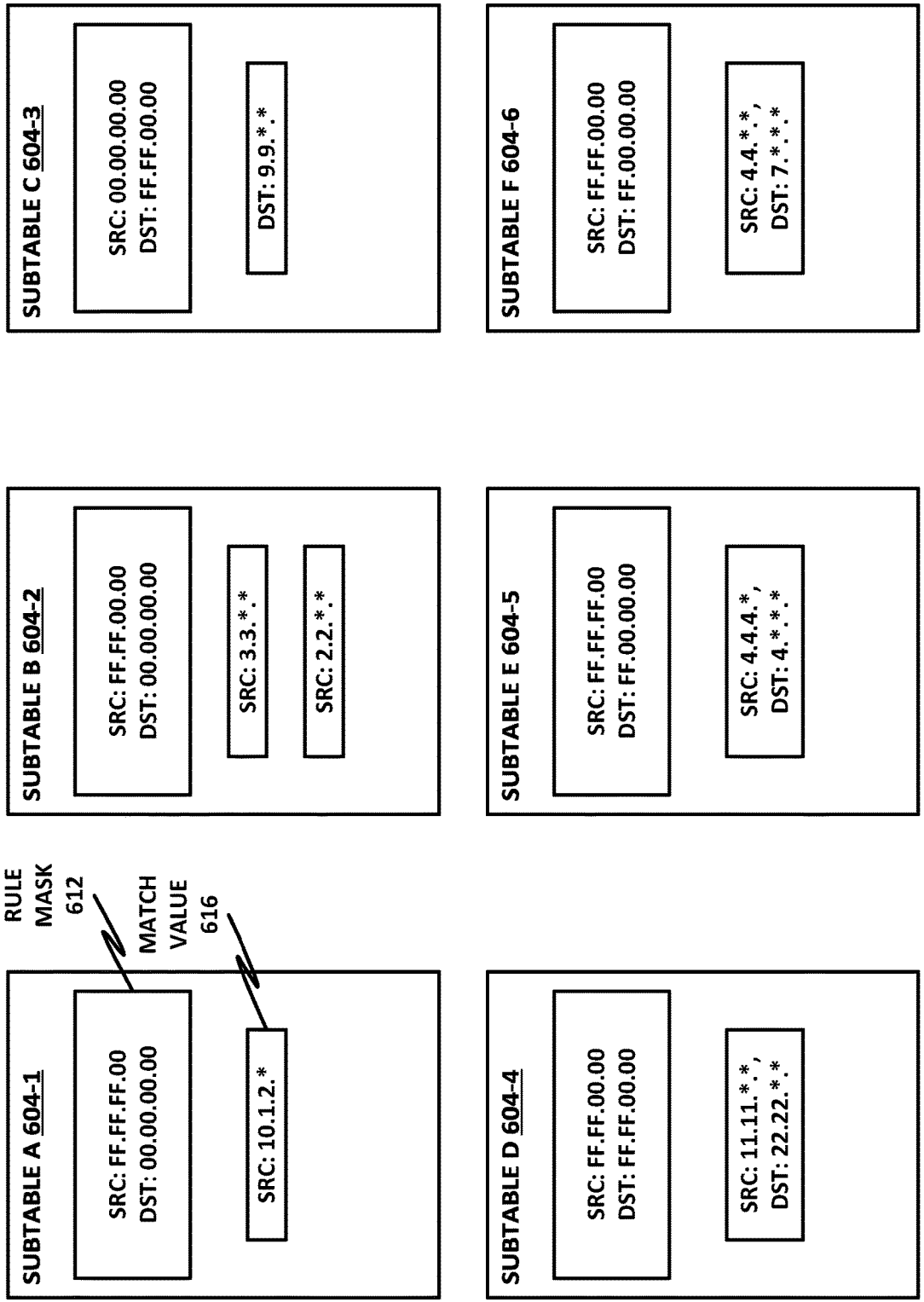
FIG. 6 is a block diagram illustrating several subtables that may, for example, be found on a data path classifier DPCLS, according to one or more examples of the present specification.

FIG. 6 is a block diagram illustrating several subtables 604 that may, for example, be found on a DPCLS such as DPCLS 512 of FIG. 5 or DPCLS 412 of FIG. 4. In this case, seven different wildcard rules may be inserted into a tuple space search (TSS) classifier. For purposes of illustration, subtables 604 of FIG. 6 assume that constraints are placed on one or more of the source IP and destination IP fields of the packet header. However, this is a nonlimiting and illustrative example only, and it should be understood that the DPCLS may select any suitable field for a search space.

Each subtable 604 is characterized by a single rule mask 612 that is used to mask out the appropriate portions of the source and destination IP address (or other fields, such as VLAN, MAC, protocol type, or any other that may be selected). One or more match values 616 may be provided within each subtable 604, with the match values 616 conforming to the rule mask 612 of that subtable 604. Note that as discussed above, a "rule" is defined by the combination of a rule mask 612 and match value 616. Each rule in a subtable 604 has the same EM5 distance, because EM5 distance is a function of the rule mask 612, not of the individual match values 616.

Subtable A has a rule R1 that matches source IP 10.1.2.*. To match this, a mask is provided on source IP of FF.FF.FF.00, thus ensuring that the upper three bytes of the source IP are maintained, while the lower byte of the source IP is treated as a "don't care." Rule 1 is stored in subtable A 604-1.

Subtable B 604-2 has two matching rules. In this case, the mask FF.FF.00.00 is applied to the source IP address, while the mask 00.00.00.00 is applied to the destination IP address. In other words, this mask matches the upper two bytes of the source IP address, and is a "don't care" for the lower two bytes of the source IP, as well as the full destination IP.

Subtable B 604-2 includes two different match values, namely 3.3.*.* and 2.2.*.*. A fourth rule R4 matches destination IP address 9.9.*.*. Thus, in the mask element, the full source IP address is treated as "don't care" (00.00.00.00), while the destination IP address mask is FF.FF.00.00. The sole match value in subtable C is destination 9.9.*.*.

Subtable D 604-4 is created to match a rule 5 (R5) that is to match IP source 11.11.*.* and destination IP 22.22.*.*. As before, none of the existing subtables have an appropriate mask to apply to the match value, so subtable D 604-4 is created with source IP mask FF.FF.00.00 and destination IP mask of FF.FF.00.00. The sole match value provided in subtable D 604-4 is source 11.11.*.*, destination 22.22.*.*.

A sixth rule (R6) is to match source IP equals 4.4.4.* and destination IP equals 4.*.*.*. In this case, again, a new mask is required, so a subtable D 604-5 is created with source mask FF.FF.FF.00 and destination mask FF.00.00.00.

A rule R7 is created with source IP equals 4.4.*.* and destination IP equals 7.*.*.*. Again, no existing subtable includes an appropriate mask, so subtable F 604-6 is created with mask of source FF.FF.00.00 and destination FF.00.00.00. The sole match value added to subtable F 604-6 is source 4.4.*.*, destination 7.*.*.*. Each of the rules R1 through R7 described in FIG. 6 may have a different EM5 value. However, rules stored in the same subtable will have the same EM5 distance, because they share the same mask. The various flows may be classified depending on their likeliness to flood the EMC, or in other words to have a large number of EMC entries pointing to that megaflow.

Consider, for example, a flow with an exact match 5-tuple rule such as rule {protocol type=UDP, source IP=10.1.1.1, destination IP=20.1.1.1, source port=111, destination port=222}. This rule would be hit by exactly one specific entry in the EMC. Thus, rule 1 has an EM5 value of 1, and will not flood the EMC.

However, consider a slightly different rule R2 with the following value: {protocol=UDP, IP source=10.1.1.*, IP destination=20.1.1.1, source port=111, destination port=222}.

Although this rule differs from the first rule by only one byte, there are 256 potential entries in the EMC that could hit this rule. Any source IP with 10.1.1, with the lowest byte between 0 and 255 will match this rule. In OVS DPDK EMC, there are 8192 entries. This is much more than the first example rule, but the second rule still may not be sufficient to flood the EMC.

Now consider a third rule: {VLAN ID=55}.

In this case, there may be a very large number of packets with VLAN ID 55. This may match a very large number of EMC entries, and thus rule 3 may flood the EMC.

The foregoing examples illustrate a qualitative analysis of whether a rule might flood the EMC. The property of EM5 distance may be used to quantitatively measure how "different" a rule is from an exact match 5-tuple rule, thus providing a quantitative analysis of how likely a rule is to flood the EMC.

FIG. 7 illustrates an example of a packet header 700 according to one or more examples of the present specification. Packet 7 700 includes a destination MAC address, a source MAC address, a VLAN ID, a protocol type, a source IP, a destination IP, source and destination ports, and other fields. Any or all of the fields illustrated here may be considered in a flow rule for a wildcard match. For illustrative purposes, not all possible fields are shown. An EM5 mask 704 may be provided to mask the fields that will be used to compute an EM5 distance. For illustration purposes, the EM5 mask and the fields that it masks are shown in black. Note that the selection of this 5-tuple for the fields used in computing the EM5 distance is provided as a nonlimiting example only, and a different EM5 mask may be used to apply other fields to compute an EM5 distance. EM5 mask 704 contains bits set to 1 only for those bits masking the 5-tuple fields {Protocol type, IP src/des, PortNr src/dest}. A hash is computed in the 5-tuple fields to point and choose a location in the EMC. All other bits in the mask are set to 0. This effectively masks out the non-selected fields.

As described above, the EM5 distance of a given flow with a rule ($Flow_R$) and a mask of the flow rule ($FLOW_{MASK}$) may be given by:

$$EM5_{Flow_R}=B(EM5_{MASK} \oplus FLOW_{MASK})$$

FIG. 8 illustrates the computation of an EM5 distance on a rule 800 according to one or more examples of the present specification. FIG. 8 assumes the use of the 5-tuple including protocol type, source IP, destination IP, and source and destination ports as illustrated in FIG. 7. Thus, EM5 mask 704 may be applied to header 800 of FIG. 8. FIG. 8 also illustrates a rule 804 which may provide a mask for a rule such as in a DPCLS. This may be, for example, one of the masks illustrated in subtables 604 of FIG. 6. In the example of FIG. 8, the rule matches the protocol type, the upper three bytes of the source IP, the upper two bytes of the destination IP, and the full source and destination ports. To compute the EM5 value, for rule 804, the number of 1 bits is computed for an exclusive-or (XOR) of EM5 mask 704 of FIG. 7 and mask 804 of FIG. 8. This yields result 808. Thus, the EM5 of rule 804 is 24, because 24 bits in result 808 are ones.

Note that if there were no wildcards in mask 804, then the EM5 would have been 0, because all of the fields in rule 804 would have been FF. Thus, the EM5 for an exact match 5-tuple is by definition 0, because the "distance" between an exact match rule and itself is 0.

Figure 9:
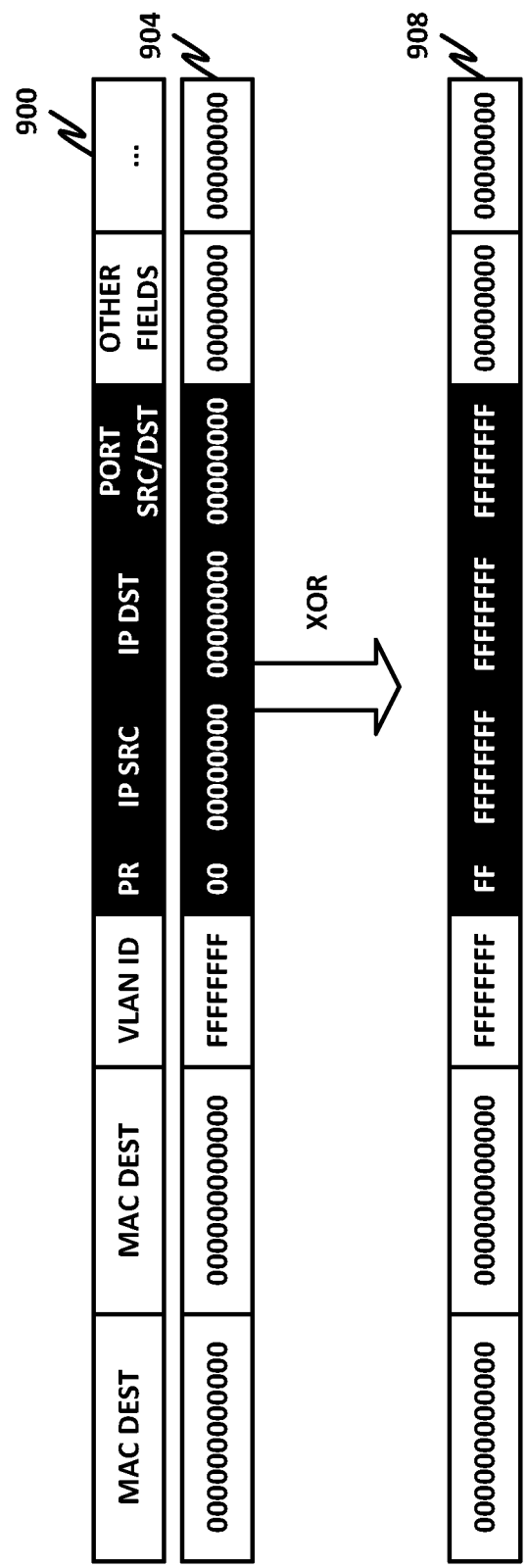
FIG. 9 illustrates a computation of E5 distance, wherein the rule is "very different" from an exact match 5-tuple rule, according to one or more examples of the present specification.

FIG. 9 illustrates an opposite extreme, wherein rule 904 is applied to packet 900. However, rule 904 includes only wildcards. Thus, performing an XOR of rule 904 against EM5 mask 704 yields all ones. Thus, the EM5 distance for rule 904 is 136, because there are 136 ones in result 908. This represents an extreme case wherein the rule is "very different" from an exact match 5-tuple rule.

Thus, the EM5 distance of a given wildcard rule quantifies how many EMC entries could satisfy the given rule. In the case of FIG. 8, $2^{24}$ equals approximately 16,000,000 flows that could match rule 804. This could easily overwhelm the EMC. In the even more extreme case of FIG. 9, $2^{136}$ (approximately 8.7 times $10^{40}$) flows could match rule 904. This would be almost guaranteed to result in EMC thrashing.

Referring back to FIG. 6, note that a subtable 604 collects rules with the same pattern mask. Thus, although a subtable 604 may include more than one entry with more than one match value (as in the case of subtable B 604-2 where the match value's source equals 3.3.*.* and source equals 2.2.*.* are both applied to the given mask, all of the entries in a subtable will have the same EM5 distance. Thus, EM5 distance of a rule depends not necessarily on the match values provided in the rule itself, but rather on the mask that is used to apply the rule.

Figure 10:
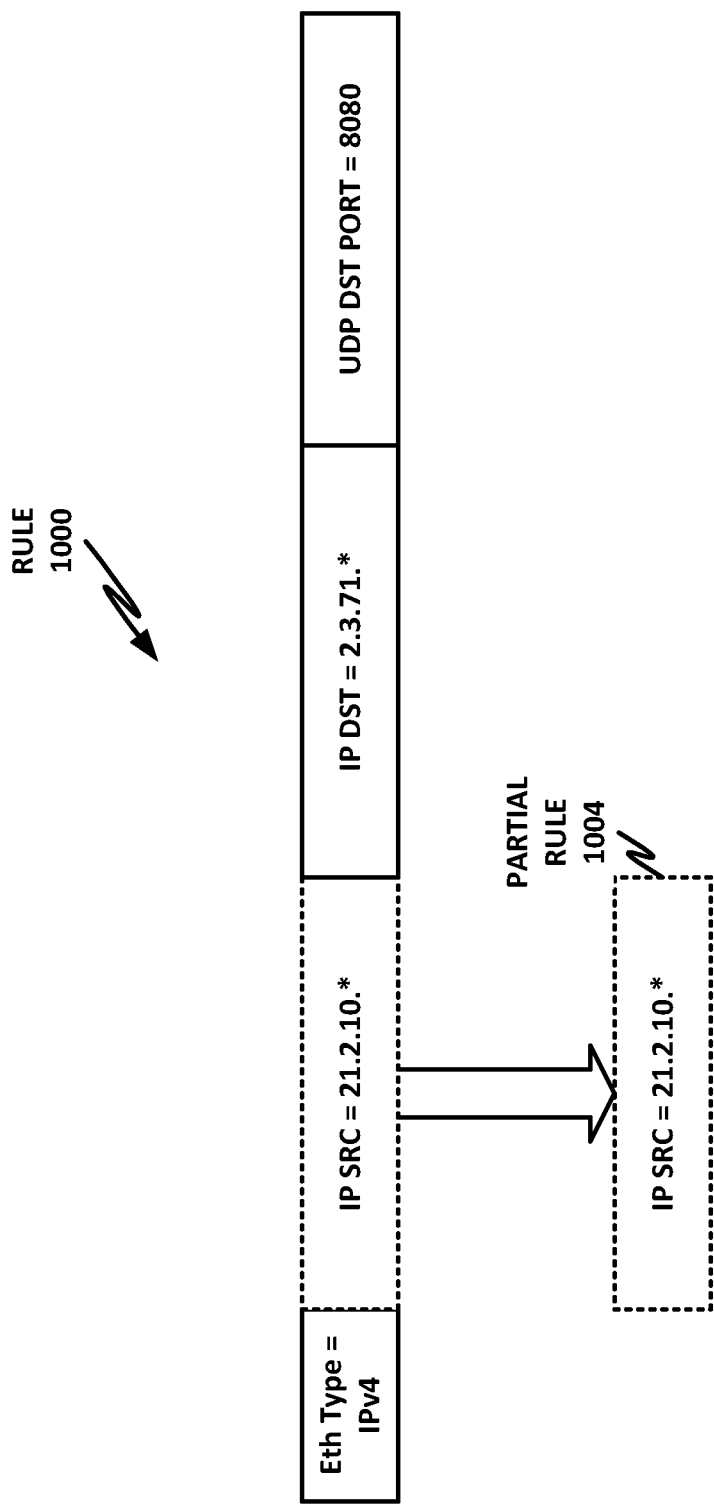
FIG. 10 illustrates the use of partial rule matching, according to one or more examples of the present specification.

FIG. 10 illustrates the use of partial rule matching, such as may be applied in a PRM 520 of FIG. 5.

In this case, a rule 1000 is provided with a particular mask, which includes Ethernet type equals Internet Protocol version 4 (IPv4), source IP equals 21.2.10.*, destination IP equals 2.3.71.*, and UDP destination port equals 8080. This rule may be stored in a subtable with an appropriate mask, such as a mask of source IP equals FF.FF.FF.00 and destination IP equals FF.FF.FF.00.

In this case, a partial rule 1004 may be defined as one field extracted from rule 1004. A partial rule can be considered as one or more fields selected from the fields available in rule 1000. The union of fields that are considered for the partial rule are referred to herein as pivot fields. In this example, the pivot field is a single field, namely the source IP. Any packet whose source IP matches 21.2.10.* matches the partial rule. Note that this is true regardless of the Ethernet type, the destination IP, or the user datagram protocol (UDP) destination port. Thus, the partial rule can be used as a first level screen on incoming packets. On the other hand, if a packet has an IP source field that does not match the partial rule 1004, then it cannot match the original rule for that packet, regardless of what the other fields are. Stated otherwise, a rule can match a partial rule only if the partial rule field matches. Thus, if a partial rule check fails, then the vSwitch can deterministically know that the packet will not match that rule.

Figure 11:
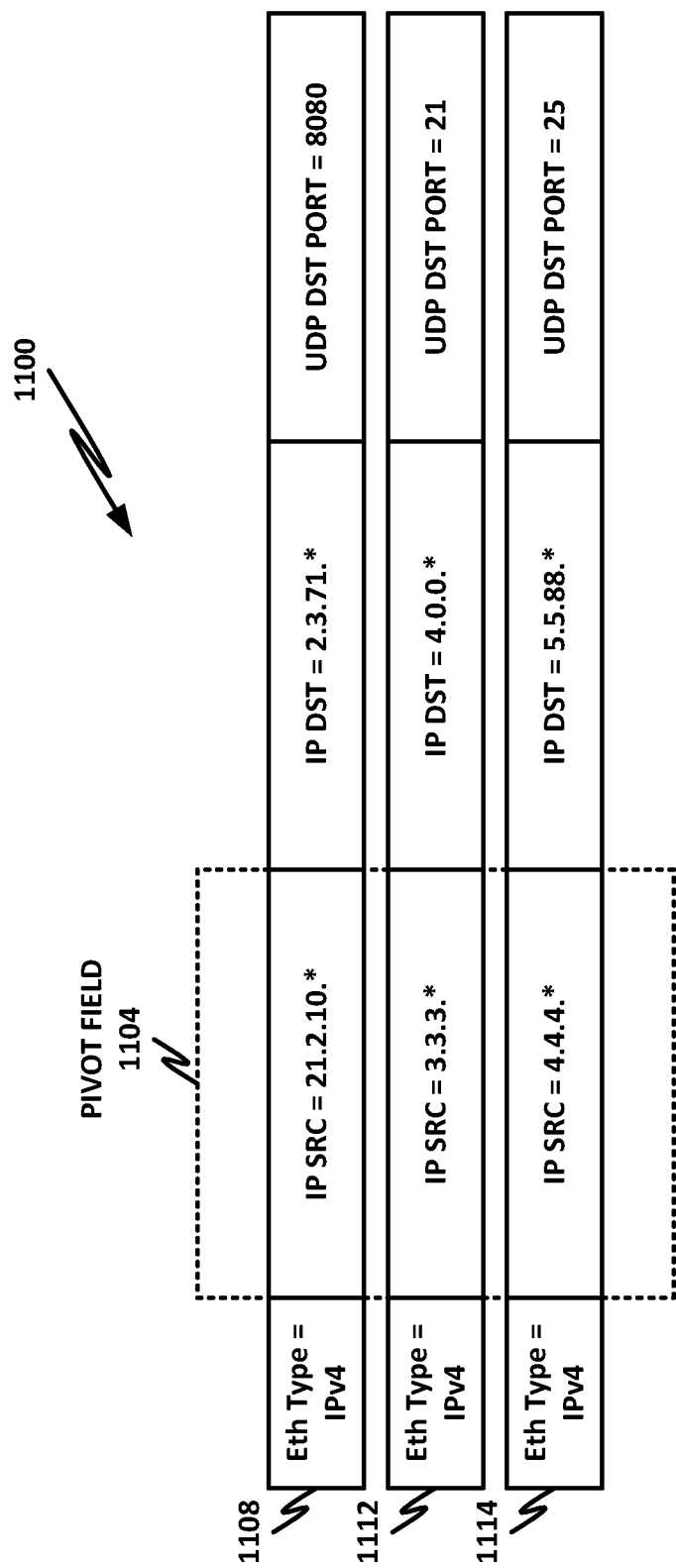
FIG. 11 illustrates an example of pivot fields on a group of wildcarded rules, according to one or more examples of the present specification.
Figure 13:
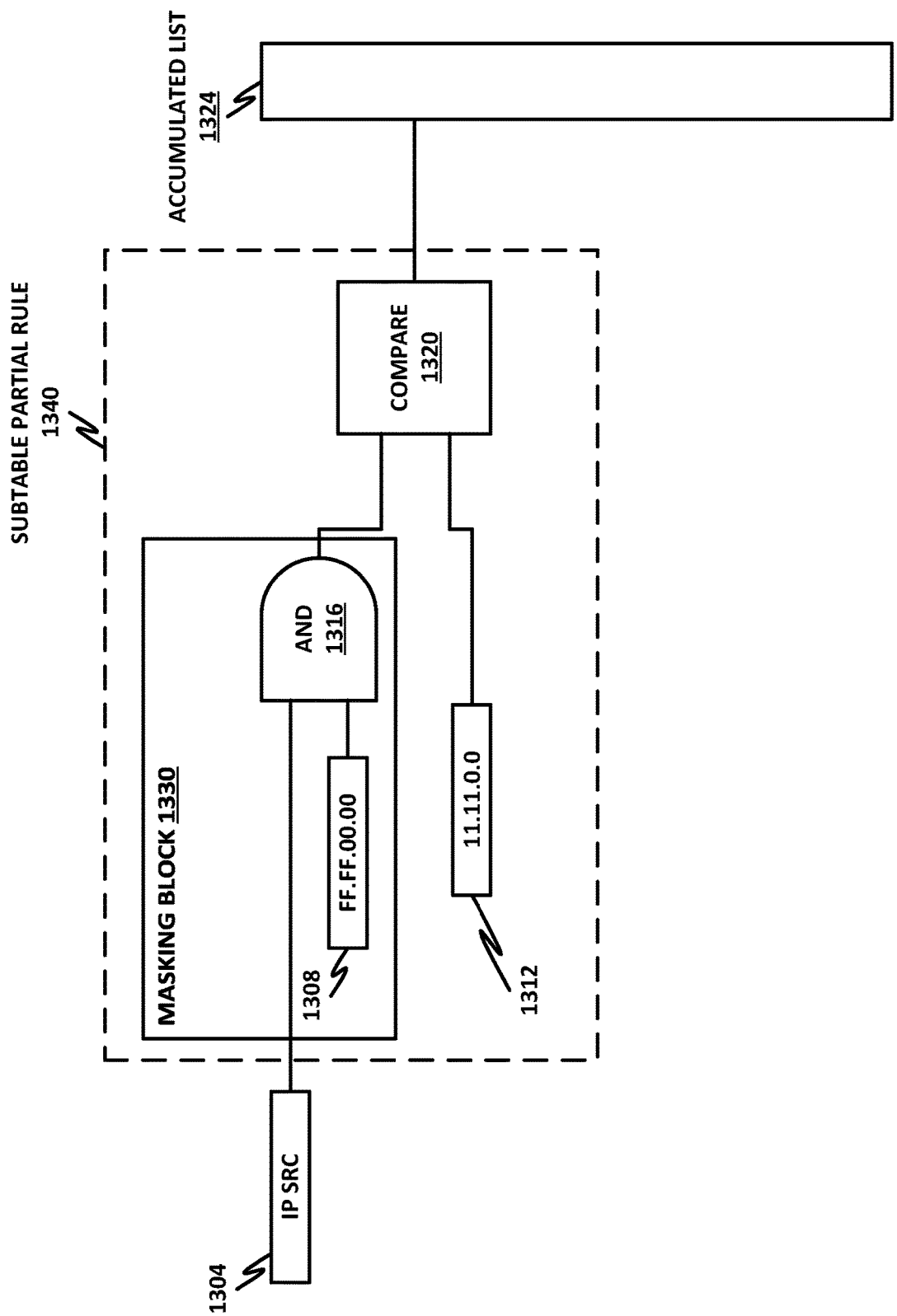
FIGS. 13-14 are block diagrams illustrating an example architecture for building a candidate list, according to one or more examples of the present specification.
Figure 14:
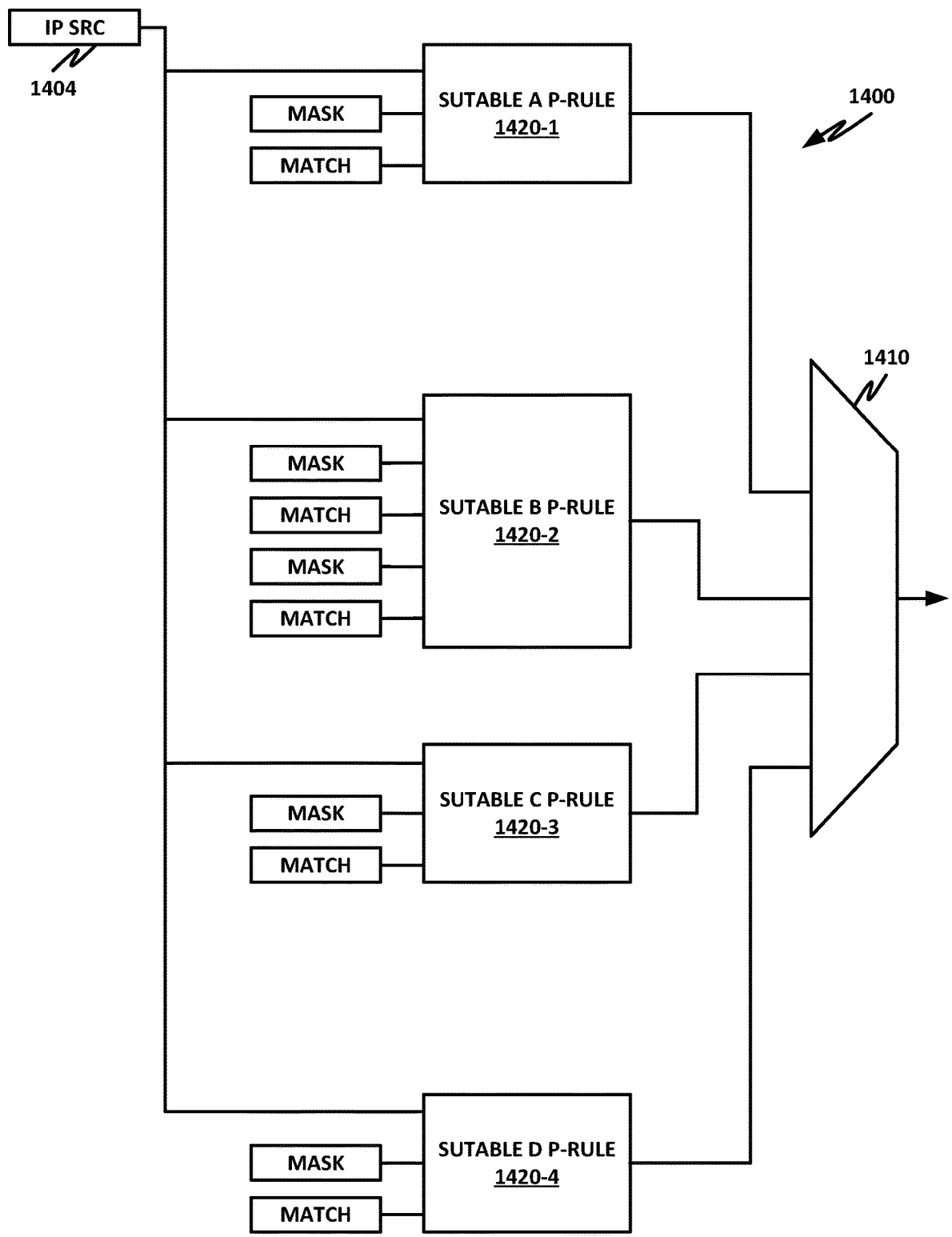

FIG. 11 illustrates an example of pivot fields on a group of wildcarded rules 1100. In this case, the pivot field 1104 is source IP as before. Note that rules 1108, 1112, and 1114 are all different from one another, but they can all exist in the same subtable because they have the same mask value. Thus, when a packet comes into the vSwitch, the pivot field is sent to the PRM. The PRM performs a check to find a match on its stored partial rules as depicted in FIGS. 13 and 14.

Each partial rule check assumes that the pivot field from the packet is masked and then compared with the partial rule value. Each match on a partial rule spawns its corresponding subtable number into the candidate list (a partial rule belongs to the subtable where the original rule is stored). The candidate list is a subset of the existing subtables where a match can potentially occur.

For example, an incoming packet may have source IP 9.0.9.0. The pivot field may be extracted from the incoming packet, and the value 9.0.9.0 may be sent to PRM 520 of FIG. 5. PRM 520 of FIG. 5 may check the pivot field against the source IP values defined in the different subtables. In this case, 9.0.9.0 will not match any of rules 1108, 1112, or 1114. Thus, the subtable containing these three rules can be eliminated as a candidate subtable for the incoming packet. Because PRM 520 has eliminated this subtable as a possibility, the subtable need not be checked in DPCLS 512. Thus, PRM 520, which may be very fast as it may execute on a hardware module such as an FPGA or ASIC, can very quickly screen out which subtables might potentially match the incoming packet. A list of potential subtables can then be provided to DPCLS 512, and DPCLS 512 need only search those particular subtables.

PRM 520 may also use the EM5 value to perform EMC search and insert decisions. The EMC lookup may be skipped depending on the EM5 distance of the candidate subtables. For example, PRM 520 determines the minimum EM5 distance for each of the candidate subtables identified as potential matches for the incoming packet. If the minimum EM5 distance for the potential subtables is greater than the EMC flood threshold defined for EMC 508, then there is no need to perform a search on EMC 508. EMC 508 can be skipped, and the packet can be searched directly on the identified subtables of DPCLS 512.

For example, if subtables A and E are the candidates, then the EM5 values for those subtables may have been previously calculated when the subtables were defined, and stored as metadata for the subtables. If the minimum EM5 distance between subtable A and subtable E is greater than the flood threshold for EMC 508, then vSwitch 504 may skip EMC lookup.

Furthermore, an EMC insertion may be skipped if the flow that was hit has an EM5 greater than the flood threshold. In other words, when DPCLS 512 finds a matching rule, if the EM5 distance for that rule is greater than the flood threshold for EMC 508, then no EMC insertion is performed.

When a new wildcard rule is inserted into DPCLS 512, vSwitch 504 may extract the partial rule by combining its pivot fields and their masks, and send the partial rule together with the subtable number to PRM 520.

Within DPCLS 512, the wildcard search will be performed by traversing only the list of candidate subtables and further considering the order from the subtable ranking when it is available. Thus, for each candidate subtable in DPCLS 512, the subtables are searched in order of their subtable rankings. For example, if PRM 520 identifies only subtable A and subtable E as candidates for the incoming packet based on the pivot field, then DPCLS 512 will search only those two subtables.

This mechanism does not yield false negatives. If a subtable is not present in the list of candidates, then it is deterministically not a match for the incoming packet. Rather, even if a subtable is present in the list of candidates, it is not necessarily true that the packet will actually match a rule in that subtable. Stated otherwise, the subtable matches only if the pivot field matches, but not if and only if the pivot field matches.

Figure 12:
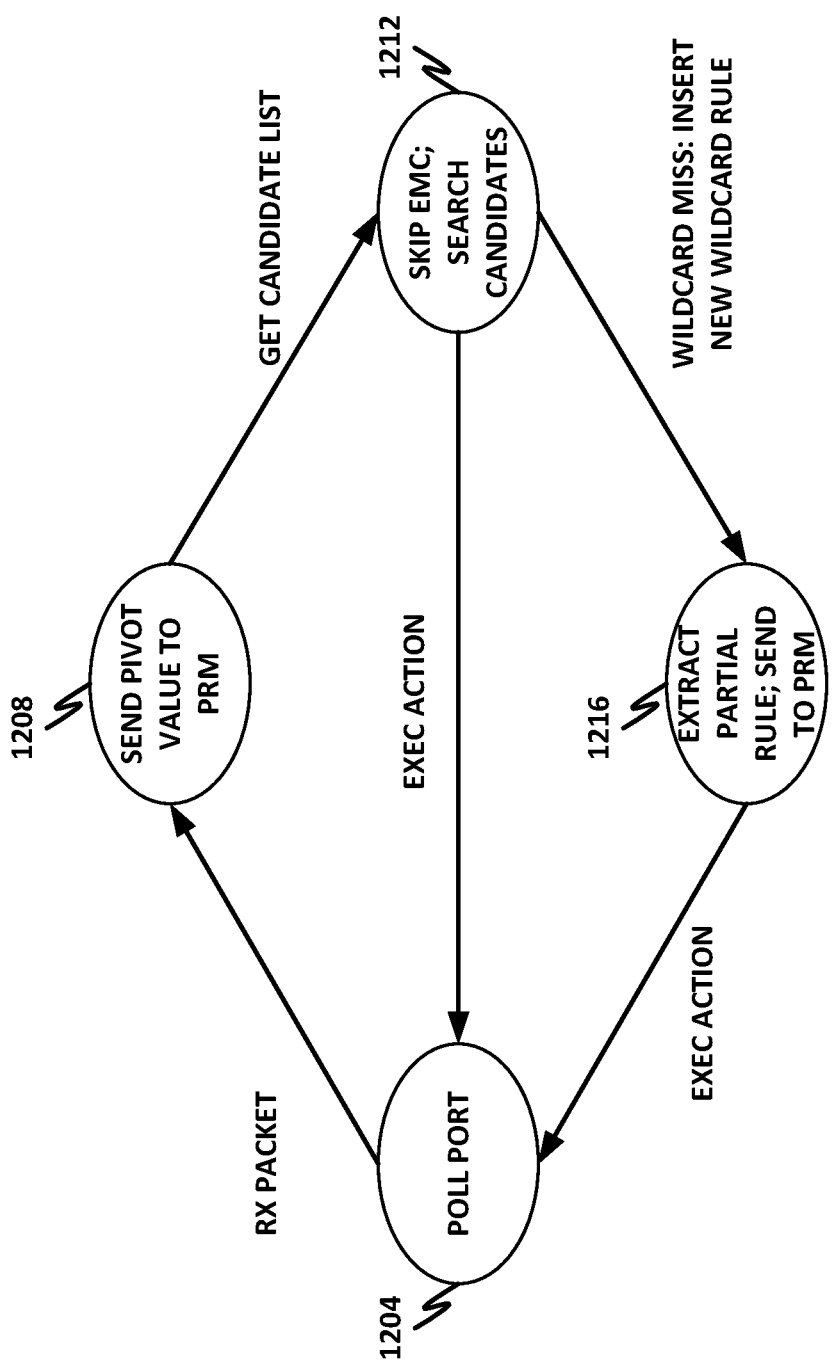
FIG. 12 is a state machine diagram illustrating a workflow, according to one or more examples of the present specification.

FIG. 12 is a state machine diagram illustrating a workflow according to one or more examples of the present specification. Note that the workflow may begin with an observation time during which the vSwitch controller monitors the DPCLS and detects that wildcard rules have not changed for a given time. Once the wildcard rules have reached a state of relative stability, the vSwitch controller may select a pivot field. Selection of a pivot field is described in additional detail below.

The PRM may then store the set of partial rules collected from the DPCLS subtable entries.

In the meantime, if the wildcard rules change, then the pivot field may be recalculated.

Thus, as illustrated in FIG. 12, in state 1204, the vSwitch polls its ingress port and receives a packet. In state 1208, the vSwitch extracts the pivot field and sends the pivot field's value to the PRM.

The PRM checks the pivot field value against the pivot fields of the subtables, and determines a set of potentially matching subtables referred to as a candidate list. The PRM can then send the candidate list to the vSwitch.

In state 1212, based on the data received from the PRM, the vSwitch determines whether the EMC table should be searched. If the EMC table is to be searched, and if an EMC match is found, then the vSwitch executes the flow action on the packet and the state returns to state 1204. More specifically, in the case of OvS-DPDK, the polling thread (the one that dequeue packets from an ingress port) carries out lookups on the EMC and DPCLS, and then executes the flow actions on the classified packets If the EMC is not to be searched, then the vSwitch searches the DPCLS according to the candidates in the candidate list. If there is a match, then again, the vSwitch executes the appropriate action and the state returns to state 1204.

If there is a wildcard miss on the DPCLS, then the flow will go to the OpenFlow table, and the OpenFlow table will perform a full lookup. The OpenFlow table may then insert a new wildcard rule into the DPCLS. In state 1216, the vHost controller extracts a partial rule from the new rule that was added to the DPCLS. Note that this new rule may need to be provisioned in its own subtable, or it may be able to be added to a subtable with a matching mask. In either case, the vHost controller sends the new partial rule with the pivot field to the PRM. The vSwitch may then execute the appropriate flow action, and again the state returns to state 1204.

Considering again FIG. 6, as in existing implementations, there may be the six subtables 604-1 through 604-6. The subtables in the DPCLS may be identical between an existing system and a system that takes advantage of the teachings related to an EM5 distance, as disclosed in the specification.

Taking the subtables 604 of FIG. 6, a pivot field may be selected according to the methods described below. Assume, for example, that the destination IP is selected as the pivot field. The rules of subtables A through F are displayed with their corresponding partial rules on the right-hand side.

---

SbtA: R1 = IPsource: 10.1.2.* → = {10.1.2.0, FF.FF.FF.00,
Partial-R1    SbtA}

-continued

| | | |
|---|---|---|
| SbtB: | R2 = IPsource: 2.2.*.* → Partial-R2 | = {2.2.0.0, FF.FF.00.00, SbtB} |
| SbtB: | R3 = IPsource: 3.3.*.* → Partial-R3 | = {3.3.0.0, FF.FF.00.00, SbtB} |
| SbtC: | R4 = IPdest: 9.9.*.* → Partial-R4 | = {0.0.0.0, 00.00.00.00, SbtC} |
| SbtD: | R5 = {IPsource: 11.11.*.*, IPdest: 22.22.*.*} → Partial-R5 | = {11.11.0.0, FF.FF.00.00, SbtD} |
| SbtE: | R6 = {IPsource: 4.4.4.*, IPdest: 4.*.*.*} → Partial-R6 | = {4.4.4.0, FF.FF.FF.00, SbtE} |
| SbtF: | R7 = {IPsource: 4.4.*.*, IPdest: 7.*.*.*} → Partial-R7 | = {4.4.0.0, FF.FF.00.00, SbtF} |

To illustrate an example output, assume the following sequence of three packets:

Packet 1={IP source: 2.2.55.55, IP dest: 8.8.8.8}→matches partial rule 2 and partial rule R4→output list: {subtable B, subtable C}→Wildcard search for packet 1 will be executed only on subtable B and subtable C.

Packet 2={IP source: 11.11.1.1, IP dest: 3.3.3.3}→matches partial rule R4 and partial rule R5→output list: {subtable C, subtable D}→wildcard search for packet 2 will be executed only on subtable C and subtable D.

Packet 3={IP source: 4.4.4.8, IP dest: 9.9.9.9}→matches partial rule R4, partial rule R6, and partial rule R7→output list: {subtable C, subtable E, subtable F}→wildcard search for packet 3 is executed only on subtable C, subtable E, and subtable F.

In certain embodiments, the candidate list of subtables to be searched may be formatted as a bitmap. A "1" at the $i^{th}$ bit position means that the $i^{th}$ subtable can potentially contain a matching rule for the given packet. Thus, this table should be checked for a match, while tables masked out with a 0 should not be searched.

It follows that a "0" at the $i^{th}$ bit position means that the $i^{th}$ subtable does not contain any matching rule for the given packet and that subtable can be skipped during the wildcard search.

When a new packet is received, before searching in the EMC and the TSS wildcard table, the pivot field of the packet may be extracted and passed to the PRM. The PRM may check the pivot value against all stored partial rules. The output may be a bitmap that represents a subset of the current subtables where potentially there could be a matching rule. Depending on the minimum EM5 value of the subtables present in the candidate list, the vSwitch may decide to skip the EMC search, because the minimum EM5 distance value is greater than the threshold for which values are not added to the EMC. This benefits the wildcard search because it is performed on a smaller set of subtables. An EMC insertion is carried out only if the matching megaflow has an EM5 distance beneath the threshold.

FIGS. 13-14 are block diagrams illustrating an example architecture for building a candidate list according to one or more examples of the present specification.

Inside the PRM, a check for a match on a partial rule is accomplished at first by applying the mask to the pivot field and then comparing the result with the pivot rule value. If these are equal, the corresponding subtable index is added to the output list.

For example, as illustrated in FIG. 13, the partial rule may include the mask of FF.FF.00.00 and the value 11.11.0.0, as illustrated in subtable D 604-4 of FIG. 6. Note that the logic for creating the candidate list may include a plurality of subtable partial rules 1340. In FIG. 13, a single subtable partial rule 1340 is illustrated in greater detail as an example of the concept. However, FIG. 14 illustrates a partial rule matcher 1400 in which a plurality of subtable partial rules 1420 are provided.

Returning to FIG. 13, each subtable partial rule 1340 may include a partial rule mask 1308 (i.e., FF.FF.00.00) and a match partial rule value 1312 (i.e., 11.11.0.0). A subtable partial rule 1340 also receives as an input the pivot field 1304 extracted from the incoming packet being tested. Note that because subtable D 604-4 of FIG. 6 includes only a single rule, there is only a single masking block 1330. Matching rule block 1330 applies just the mask to the input pivot field IP SRC. The output is then compared with the PR value 1312 by comparison block 1320. But in subtables with more than one rule, a masking block 1330 may be provided for each rule in the subtable. For example, subtable B 604-2 of FIG. 6 includes two rules, and thus would include two masking blocks 1330. More generally, a subtable having N rules will include N rule matching blocks 1330.

As illustrated in FIG. 14, each partial rule check may be executed in parallel. In this example, for simplicity of the illustration, only four subtables are illustrated. However, in a common implementation, there may be as many as tens of subtables. Advantageously, a PRM such as an FPGA can be programmed in hardware to perform all of the partial rule matches in parallel so that they can be performed very quickly. In this example, an incoming packet has a pivot field, which in this case is source IP address 1404. The source IP address 1404 is provided to each partial rule block 1420, namely subtable A partial rule 1420-1, subtable B partial rule 1420-2, subtable C partial rule 1420-3, and subtable D partial rule 1420-4. If these subtables correspond to the subtables in FIG. 6, then as discussed above, subtable B 604-2 includes two rules, in which case two mask and match pairs are provided as inputs to subtable B rule 1420-2, so that IP source 1404 can be matched against both rules. The output of each subtable partial rule 1420 may be a single bit, either a 1 or a 0, indicating whether IP source 1404 may potentially match that partial rule. These bits may be accumulated into candidate accumulator 1410 and be output, for example, as a bitmap of filtered subtables.

As illustrated in FIG. 15, selection of a pivot field for use in the PRM is a nontrivial consideration. A poorly selected pivot field may end up being of little or no value, or may even hurt the performance of the overall system. On the other hand, the selection of a good pivot field that limits the number of candidates in the candidate list for the greatest number of input packets is very useful.

FIG. 15 illustrates an example of four subtables with their masks and respective hits percentages in a table 1500, according to one or more examples of the present specification. Selection of a pivot field may be performed by considering the intersection of fields included in the rules in the subtable masks in table 1500.

Consider, for example, subtable 1. Subtable 1 collects rules with mask FF.FF.FF.FF on the VLAN ID and FF.FF.FF.00 on the IP source.

On the other hand, subtable 2 is marked as first place, having an overall of 60% of incoming traffic hitting subtable 2. It has a mask FF.FF.FF.00 on the IP destination.

With these considerations, the VLAN ID may be considered a poor choice for a pivot field. The VLAN ID is masked only in subtable 1, meaning that for subtables 2, 3, and 4, the VLAN ID is completely wildcarded. This means that the candidate list will always include subtables 2, 3, and 4, unless the packet belongs to subtable 1. Because subtable 1 represents 10% of traffic, 90% of candidate lists will include subtables 2, 3, and 4, while 10% will include only subtable 1. This is a less than optimal choice.

Instead, criteria may be used to optimize pivot field selection. These may include, for example:
  a. Select a field that is present in the highest number of masks.
  b. Privilege or bias towards fields that are present in top-ranked subtable masks.

From the example above, the first criterion implies that IP source and IP destination may be good candidates for pivot fields. Each of these shows up in two of the four subtables. However, using criterion b, IP destination may be considered a better candidate than IP source, because IP destination shows up in subtable 2, which receives 60% of traffic. Thus, by biasing selection toward subtables that receive a majority of traffic, it is seen that it is more likely to get a good hit on the IP destination than on the IP source.

From the example in FIG. 15, based solely on the subtable ranking (i.e., absent the teachings of this specification), the wildcard search would traverse the subtables as follows: sbt #2 (60%)=>sbt #3 (30%)=>sbt #1 (10%)=>sbt #4 (0%).

A beneficial effect of the candidate list is that it excludes some subtables. However, in this example if the candidate list excludes sbt #4, no substantial advantage is realized. Optimally, the candidate would exclude the top-ranked non-matching subtables. To accelerate the wildcard search for packets hitting low-ranked subtables, it is beneficial to exclude higher-ranked subtables from the search.

If for a given packet the PRM excludes the top-ranked subtables, it is privileging packets belonging to a minority flow (e.g., control plane packets). The PRM will ensure that these packets are classified faster because it skips the search on the top-ranked subtables. In other words, if a packet will hit a rule stored in the third ranked subtable, it is beneficial for the PRM to exclude the two subtables ranked as 1st and as second. This allows the wildcard search to start at the third-ranked subtable, where the match will happen.

In general, the more subtables excluded by the PRM, the better. But even better results can be achieved by excluding high-ranked subtables. For example, if in this example, source IP had been chosen as a pivot, Subtable 2 would be included. This is the top-ranked subtable with 60% of hits, and it would always be in the candidate list. This means that all remaining traffic hitting Subtable 1 (10%), Subtable 3 (30%), and Subtable 4 (0%) (a combined 40% of all traffic) will first be searched on subtable 2 without a hit.

In a real-world scenario with tens of thousands of different wildcard rules existing on some tens of subtables, each 4-byte pivot with its 4-byte bit mask may be provisioned in the PRM as illustrated in FIG. 14. For example, if there are 100,000 wildcard rules, then the 4-byte pivot plus the 4-byte mask is 8 bytes total, times 100,000 entries, meaning 800 kilobytes of space is used in the PRM.

Note that this mechanism is scalable as more than one pivot field can be selected to narrow the final list of candidates. For example, with two pivot fields named PVT_1 and PVT_2, there may be two corresponding candidate lists: candidate 1 and candidate 2. By considering the intersection:

Candidate_1∩Candidate_2

This intersection can be used to obtain the final candidate list, with subtables that are present in both candidate 1 and candidate 2. Thus, a plurality of pivot fields may be used to further narrow or focus the candidate list.

Figure 16:
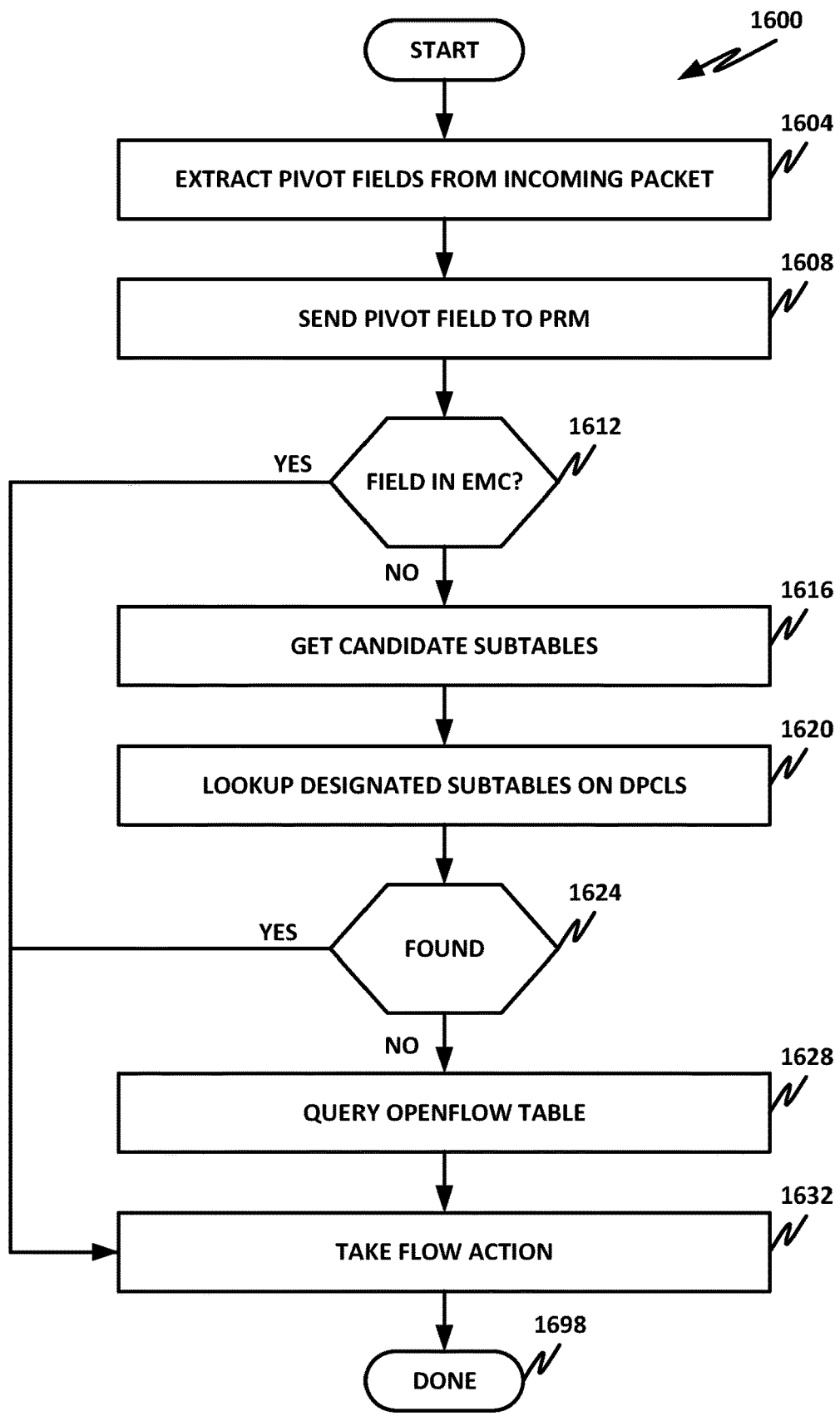
FIG. 16 is a flowchart of a method of performing flow control accounting for EM5 distance, according to one or more examples of the present specification.

FIG. 16 is a flowchart of a method 1600 of performing flow control accounting for EM5 distance, according to one or more examples of the present specification.

In block 1604, the vSwitch receives an incoming packet and extracts one or more pivot fields from the incoming packet.

In block 1608, the vSwitch sends the one or more pivot field to a PRM. The PRM matches the pivot field to its list of partial rules and identifies a candidate list. The PRM then checks that candidate list to determine if the smallest EM5 distance for the rules in that candidate list is greater than the threshold for inclusion in the EMC.

In block 1612, the system determines whether an exact match for the packet may possibly be found in the EMC. The vSwitch then hashes the header, checks the EMC for a match, and upon finding a match takes a flow action in block 1632.

Returning to block 1612, if an exact match is not found in the EMC, then in block 1616, the candidate subtables are provided to the DPCLS.

In block 1620, the DPCLS searches only the candidate subtables for a wildcard match for the packet.

In block 1624, if a match is found to a wildcard rule of one of the subtables in the DPCLS, then in block 1632, an appropriate flow action is taken.

Returning to decision block 1624, if no match is found in the DPCLS, then in block 1628, the header is provided to the OpenFlow table. In block 1628, the OpenFlow table finds an appropriate match for the packet, and in block 1632, the open vSwitch takes an appropriate action for the flow.

In block 1698, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

Note also that in certain embodiments, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms 'memory' and 'storage,' as appropriate. A nontransitory storage medium herein is expressly intended to include any nontransitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

The following examples are provided by way of illustration.

Example 1 includes a host computing apparatus, comprising: an exact match cache (EMC) to perform exact matching according to an exact match tuple; a datapath classifier (DPCLS) to provide wildcard searching in a tuple search space (TSS) comprising a plurality of subtables, the subtables having one or more rule masks; a controller to receive a first packet having a first property matching a first rule of the classifier table, and forward header data of the packet to a partial rule module (PRM); and the PRM to compute a quantitative distance between the first rule and the exact match tuple of the EMC, and to execute a flow action for the first packet according to the quantitative distance.

Example 2 includes the host computing apparatus of example 1, wherein the exact match tuple is a 5-tuple.

Example 3 includes the host computing apparatus of example 1, wherein the quantitative distance is an EM5 distance of the form $EM5\_(Flow\_R)=B(EM5\_MASK \oplus FLOW\_MASK)$, wherein Flow_R is the first flow rule and B is a number of 1 bits measured as an exclusive or of an EM5 mask and a flow mask of the first flow rule, wherein the EM5 mask is to mask a 5-tuple of a header of the first packet.

Example 4 includes the host computing apparatus of example 3, wherein the 5-tuple is protocol type, source IP address, destination IP address, source port, and destination port.

Example 5 includes the host computing apparatus of example 3, wherein the flow action comprises determining that the EM5 distance exceeds a threshold; and not writing an exact match for the first packet into the EMC.

Example 6 includes the computing apparatus of example 3, wherein: the PRM includes a first pivot field, the first pivot field comprising a field selected from the rule masks of the subtables; the header data of the packet comprises the header data masked by the first pivot field; and the PRM is to compare the masked header data of the packet to the stored pivot fields for each rule, and based on the comparison, compute and return a candidate list of rules that may match the packet.

Example 7 includes the computing apparatus of example 6, wherein the controller is a vSwitch controller configured to search the DPCLS only for the rules within the candidate list.

Example 8 includes the computing apparatus of example 6, wherein the PRM includes a second pivot field, and computing the candidate list comprises computing a first candidate list based on the first pivot field, computing a second candidate list based on the second pivot field, and returning the candidate list comprises returning an intersection of the first and second candidate lists.

Example 9 includes the host computing apparatus of example 3, wherein the PRM controller is further to store the EM5 distance for each rule as a property of that rule within the PRM.

Example 10 includes the computing apparatus of any of examples 1-9, wherein the controller is to select a pivot field from available IP packet header fields, the pivot field comprising a field used for partial rule matching.

Example 11 includes the computing apparatus of example 10, wherein selecting the pivot field comprises selecting a field that in a majority or plurality of rule masks.

Example 12 includes the computing apparatus of example 10, wherein selecting the pivot field comprises biasing in favor of a subtable that receives a majority or plurality of packets.

Example 13 includes the computing apparatus of any of examples 1-12, wherein the PRM comprises a field-programmable gate array (FPGA).

Example 14 includes the computing apparatus of any of examples 1-12, wherein the PRM comprises an application-specific integrated circuit (ASIC).

Example 15 includes the computing apparatus of any of examples 1-12, wherein the PRM comprises a co-processor.

Example 16 includes the one or more tangible, non-transitory computer-readable storage mediums having stored thereon computer-operable instructions to: communicatively couple to an exact match cache (EMC), the EMC to perform exact matching according to an exact match tuple; communicatively couple to a datapath classifier (DPCLS), the DPCLS to provide wildcard searching in a tuple search space (TSS) comprising a plurality of subtables, the subtables having one or more rule masks; receive a first packet having a first property matching a first rule of the classifier table; and compute a quantitative distance between the first rule and the exact match tuple of the EMC, and to execute a flow action for the first packet according to the quantitative distance.

Example 17 includes the one or more tangible, non-transitory computer-readable storage mediums of example 16, wherein the exact match tuple is a 5-tuple.

Example 18 includes the one or more tangible, non-transitory computer-readable storage mediums of example 16, wherein the quantitative distance is an EM5 distance of the form $EM5\_(Flow\_R)=B(EM5\_MASK \oplus FLOW\_MASK)$, wherein Flow_R is the first flow rule and B is a number of 1 bits measured as an exclusive or of an EM5 mask and a flow mask of the first flow rule, wherein the EM5 mask is to mask a 5-tuple of a header of the first packet.

Example 19 includes the one or more tangible, non-transitory computer-readable storage mediums of example 18, wherein the 5-tuple is protocol type, source IP address, destination IP address, source port, and destination port.

Example 20 includes the one or more tangible, non-transitory computer-readable storage mediums of example 18, wherein the flow action comprises determining that the EM5 distance exceeds a threshold; and not writing an exact match for the first packet into the EMC.

Example 21 includes the one or more tangible, non-transitory computer-readable storage mediums of example 18, wherein the instructions are further to: apply a first pivot field, the first pivot field comprising a field selected from the rule masks of the subtables, wherein the header data of the packet comprises the header data masked by the first pivot field; and compare the masked header data of the packet to the stored pivot fields for each rule, and based on the comparison, compute and return a candidate list of rules that may match the packet.

Example 22 includes the one or more tangible, non-transitory computer-readable storage mediums of example 21, wherein the instructions are further to search the DPCLS only for the rules within the candidate list.

Example 23 includes the one or more tangible, non-transitory computer-readable storage mediums of example 21, wherein the instructions are further to apply a second pivot field, and computing the candidate list comprises computing a first candidate list based on the first pivot field, computing a second candidate list based on the second pivot field, and returning the candidate list comprises returning an intersection of the first and second candidate lists.

Example 24 includes the one or more tangible, non-transitory computer-readable storage mediums of example 18, wherein the wherein the instructions are further to store the EM5 distance for each rule as a property of that rule.

Example 25 includes the one or more tangible, non-transitory computer-readable storage mediums of any of examples 16-24, wherein the instructions are further to select a pivot field from available IP packet header fields, the pivot field comprising a field used for partial rule matching.

Example 26 includes the one or more tangible, non-transitory computer-readable storage mediums of example 25, wherein selecting the pivot field comprises selecting a field that in a majority or plurality of rule masks.

Example 27 includes the one or more tangible, non-transitory computer-readable storage mediums of example 25, wherein selecting the pivot field comprises biasing in favor of a subtable that receives a majority or plurality of packets.

Example 28 includes the one or more tangible, non-transitory computer-readable storage mediums of any of examples 16-27, wherein the instructions comprise instructions for provisioning a field-programmable gate array (FPGA).

Example 29 includes the one or more tangible, non-transitory computer-readable storage mediums of any of examples 16-27, wherein the instructions comprise instructions for provisioning an application-specific integrated circuit (ASIC).

Example 30 includes a method of providing flow control according to a quantitative distance between an exact match tuple of an exact match cache (EMC) and a rule, comprising: communicatively coupling to the exact match cache (EMC), the EMC to perform exact matching according to an exact match tuple; communicatively couple to a datapath classifier (DPCLS), the DPCLS to provide wildcard searching in a tuple search space (TSS) comprising a plurality of subtables, the subtables having one or more rule masks; receiving a first packet having a first property matching a first rule of the classifier table; computing the quantitative distance; and executing a flow action for the first packet according to the quantitative distance.

Example 31 includes the method of example 30, wherein the exact match tuple is a 5-tuple.

Example 32 includes the method of example 31, wherein the quantitative distance is an EM5 distance of the form $EM5\_(Flow\_R)=B(EM5\_MASK \oplus FLOW\_MASK)$, wherein Flow_R is the first flow rule and B is a number of 1 bits measured as an exclusive or of an EM5 mask and a flow mask of the first flow rule, wherein the EM5 mask is to mask a 5-tuple of a header of the first packet.

Example 33 includes the method of example 32, wherein the 5-tuple is protocol type, source IP address, destination IP address, source port, and destination port.

Example 34 includes the method of example 32, wherein the flow action comprises determining that the EM5 distance exceeds a threshold; and not writing an exact match for the first packet into the EMC.

Example 35 includes the method of example 32, further comprising: applying a first pivot field, the first pivot field comprising a field selected from the rule masks of the subtables, wherein the header data of the packet comprises the header data masked by the first pivot field; and comparing the masked header data of the packet to the stored pivot fields for each rule, and based on the comparison, computing and return a candidate list of rules that may match the packet.

Example 36 includes the method of example 35, further comprising searching the DPCLS only for the rules within the candidate list.

Example 37 includes the method of example 35, further comprising applying a second pivot field, wherein computing the candidate list comprises computing a first candidate list based on the first pivot field, computing a second candidate list based on the second pivot field, and returning the candidate list comprises returning an intersection of the first and second candidate lists.

Example 38 includes the method of example 32, further comprising storing the EM5 distance for each rule as a property of that rule.

Example 39 includes the method of any of examples 30-38, further comprising selecting a pivot field from available IP packet header fields, the pivot field comprising a field used for partial rule matching.

Example 40 includes the method of example 39, wherein selecting the pivot field comprises selecting a field that in a majority or plurality of rule masks.

Example 41 includes the method of example 39, wherein selecting the pivot field comprises biasing in favor of a subtable that receives a majority or plurality of packets.

Example 42 includes an apparatus comprising means to perform the method of any of examples 30-41.

Example 43 includes the apparatus of example 42, wherein the means comprise a vSwitch controller and a partial rule module (PRM).

Example 44 includes the apparatus of example 43, wherein the PRM comprises a field-programmable gate array (FPGA).

Example 45 includes the apparatus of example 43, wherein the PRM comprises an application-specific integrated circuit.

Example 46 includes the apparatus of example 43, wherein the PRM comprises a co-processor.

What is claimed is:

1. A host computing apparatus, comprising:
   an exact match cache (EMC) to perform exact matching according to an exact match tuple;
   a datapath classifier (DPCLS) to provide wildcard searching in a tuple search space (TSS) comprising a plurality of subtables, the subtables having one or more rule masks;
   a controller to receive a first network packet having a first property matching a first rule of a classifier table of the DPCLS, and forward header data of the first network packet to a partial rule module (PRM); and
   the PRM to compute a quantitative distance between the first rule and the exact match tuple of the EMC, wherein the quantitative distance is based at least in part on a network flow mask, and to execute a network flow action for the first network packet according to the quantitative distance, the network flow action comprising assigning the first network packet to a network flow selected from among a plurality of network flows.

2. The host computing apparatus of claim 1, wherein the exact match tuple is a 5-tuple.

3. The host computing apparatus of claim 1, wherein the quantitative distance is an EM5 distance of the form $EM5_{Flow_R}=B(EM5_{MASK} \oplus FLOW_{MASK})$, wherein $Flow_R$ is the first flow rule and B is a number of 1 bits measured as an exclusive or of an EM5 mask and a flow mask of the first flow rule, wherein the EM5 mask is to mask a 5-tuple of a header of the first packet.

4. The host computing apparatus of claim 3, wherein the 5-tuple is protocol type, source IP address, destination IP address, source port, and destination port.

5. The host computing apparatus of claim 3, wherein the flow action comprises determining that the EM5 distance exceeds a threshold; and not writing an exact match for the first packet into the EMC.

6. The computing apparatus of claim 3, wherein:
   the PRM includes a first pivot field, the first pivot field comprising a field selected from the rule masks of the subtables;
   the header data of the packet comprises the header data masked by the first pivot field; and
   the PRM is to compare the masked header data of the packet to the stored pivot fields for each rule, and based on the comparison, compute and return a candidate list of rules that may match the packet.

7. The computing apparatus of claim 6, wherein the controller is a vSwitch controller configured to search the DPCLS only for the rules within the candidate list.

8. The computing apparatus of claim 6, wherein the PRM includes a second pivot field, and computing the candidate list comprises computing a first candidate list based on the first pivot field, computing a second candidate list based on the second pivot field, and returning the candidate list comprises returning an intersection of the first and second candidate lists.

9. The host computing apparatus of claim 3, wherein the PRM controller is further to store the EM5 distance for each rule as a property of that rule within the PRM.

10. The computing apparatus of claim 1, wherein the controller is to select a pivot field from available IP packet header fields, the pivot field comprising a field used for partial rule matching.

11. The computing apparatus of claim 10, wherein selecting the pivot field comprises selecting a field that is in a majority or plurality of rule masks.

12. The computing apparatus of claim 10, wherein selecting the pivot field comprises biasing in favor of a subtable that receives a majority or plurality of packets.

13. The computing apparatus of claim 1, wherein the PRM comprises a field-programmable gate array (FPGA).

14. The computing apparatus of claim 1, wherein the PRM comprises an application-specific integrated circuit (ASIC).

15. The computing apparatus of claim 1, wherein the PRM comprises a co-processor.

16. One or more tangible, non-transitory computer-readable storage mediums having stored thereon computer-operable instructions to:

communicatively couple to an exact match cache (EMC), the EMC to perform exact matching according to an exact match tuple;

communicatively couple to a datapath classifier (DPCLS), the DPCLS to provide wildcard searching in a tuple search space (TSS) comprising a plurality of subtables, the subtables having one or more rule masks;

receive a first network packet having a first property matching a first rule of the classifier table; and compute a quantitative distance between the first rule and the exact match tuple of the EMC, wherein the quantitative distance is based at least in part on a network flow mask, and to execute a network flow action for the first network packet according to the quantitative distance, the network flow action comprising assigning the first network packet to a network flow selected from among a plurality of network flows.

17. The one or more tangible, non-transitory computer-readable storage mediums of claim 16, wherein the exact match tuple is a 5-tuple.

18. The one or more tangible, non-transitory computer-readable storage mediums of claim 16, wherein the quantitative distance is an EM5 distance of the form $EM5_{Flow_R}=B(EM5_{MASK} \oplus FLOW_{MASK})$, wherein $Flow_R$ is the first flow rule and B is a number of 1 bits measured as an exclusive or of an EM5 mask and a flow mask of the first flow rule, wherein the EM5 mask is to mask a 5-tuple of a header of the first packet.

19. The one or more tangible, non-transitory computer-readable storage mediums of claim 18, wherein the 5-tuple is protocol type, source IP address, destination IP address, source port, and destination port.

20. The one or more tangible, non-transitory computer-readable storage mediums of claim 18, wherein the flow action comprises determining that the EM5 distance exceeds a threshold; and not writing an exact match for the first packet into the EMC.

21. The one or more tangible, non-transitory computer-readable storage mediums of claim 18, wherein the instructions are further to:

apply a first pivot field, the first pivot field comprising a field selected from the rule masks of the subtables, wherein the header data of the packet comprises the header data masked by the first pivot field; and compare the masked header data of the packet to the stored pivot fields for each rule, and based on the comparison, compute and return a candidate list of rules that may match the packet.

22. The one or more tangible, non-transitory computer-readable storage mediums of claim 21, wherein the instructions are further to search the DPCLS only for the rules within the candidate list.

23. The one or more tangible, non-transitory computer-readable storage mediums of claim 21, wherein the instructions are further to apply a second pivot field, and computing the candidate list comprises computing a first candidate list based on the first pivot field, computing a second candidate list based on the second pivot field, and returning the candidate list comprises returning an intersection of the first and second candidate lists.

24. A method of providing flow control according to a quantitative distance between an exact match tuple of an exact match cache (EMC) and a rule, comprising:

communicatively coupling to the exact match cache (EMC), the EMC to perform exact matching according to an exact match 5-tuple;

communicatively couple to a datapath classifier (DPCLS), the DPCLS to provide wildcard searching in a tuple search space (TSS) comprising a plurality of subtables, the subtables having one or more rule masks;

receiving a first network packet having a first property matching a first rule of the classifier table;

computing the quantitative distance, wherein the quantitative distance is based at least in part on a network flow mask; and executing a network flow action for the first network packet according to the quantitative distance, the network flow action comprising assigning the first network packet to a network flow selected from among a plurality of network flows.

25. The method of claim 24, wherein the quantitative distance is an EM5 distance of the form $EM5_{Flow_R}=B(EM5_{MASK} \oplus FLOW_{MASK})$, wherein $Flow_R$ is the first flow rule and B is a number of 1 bits measured as an exclusive or of an EM5 mask and a flow mask of the first flow rule, wherein the EM5 mask is to mask a 5-tuple of a header of the first packet.

* * * * *